United States Patent [19]
Nomura

[11] Patent Number: 5,872,439
[45] Date of Patent: Feb. 16, 1999

[54] MOTOR CONTROL DEVICE

[75] Inventor: Masaru Nomura, Tenri, Japan

[73] Assignee: Sharp Kabushiki Kaisha, Osaka, Japan

[21] Appl. No.: 688,735

[22] Filed: Jul. 31, 1996

[30] Foreign Application Priority Data

Aug. 1, 1995 [JP] Japan .................................. 7-196597

[51] Int. Cl.$^6$ .................................................. G11B 7/095
[52] U.S. Cl. .................... 318/632; 360/78.04; 369/44.14
[58] Field of Search ................................... 318/560, 561,
318/563, 566, 632; 360/75, 78.01, 78.04;
369/43, 44.11, 44.14, 44.32

[56] References Cited

U.S. PATENT DOCUMENTS

| | | |
|---|---|---|
| 4,954,907 | 9/1990 | Takita . |
| 5,473,230 | 12/1995 | Dunn et al. .......................... 318/632 X |
| 5,581,521 | 12/1996 | Nomura et al. ............................. 369/32 |
| 5,633,846 | 5/1997 | Okuyama et al. .................... 369/44.34 |

FOREIGN PATENT DOCUMENTS

| | | |
|---|---|---|
| 3-293988 | 12/1991 | Japan . |
| 6-52563 | 2/1994 | Japan . |

OTHER PUBLICATIONS

Onishi, K., Control of Electric Motor and Robot, Journal of the Institute of Electrical Engineers of Japan, 110:8, p. 657–660 (1990).

*Primary Examiner*—Bentsu Ro
*Attorney, Agent, or Firm*—David G. Conlin; William J. Daley, Jr.

[57] ABSTRACT

A motor control device for controlling a swing motor which moves a head is provided with a disturbance observer and an operation suspending unit. The disturbance observer outputs a compensating signal for compensating a driving voltage V for driving the swing motor. The operation suspending unit suspends an operation of the disturbance observer, based on a detection signal supplied by a velocity sensor which detects an angular velocity of the swing motor and the driving voltage signal V for driving the swing motor. The operation suspending unit operates when the signal voltage in the disturbance observer exceeds a reference level. This arrangement solves the following problem arising when the disturbance observer is employed for controlling a motor: when the motor comes into collisions with a stopper at an edge of the motion space, the disturbance observer further drives the motor so as to oppose a motion caused by the collisions, thereby exacerbating the collision.

21 Claims, 31 Drawing Sheets

13b (13d, 13e, 13h)

13g

NEGATIVE INPUT
POSITIVE INPUT

ACCELERATION DETECTING DIRECTION

MOTOR CONTROL DEVICE

FIELD OF THE INVENTION

The present invention relates to a control device for controlling driving means such as a motor, the control device being employed for servo control and access control of an apparatus such as an optical disk apparatus.

BACKGROUND OF THE INVENTION

An apparatus such as an optical disk apparatus or a magnetic disk apparatus is generally arranged (1) to perform tracking servo control for positioning, on a specific track of a disk, an optical pickup or a magnetic head so as to record and reproduce information to and from the disk, and (2) to perform access control for quickly moving the optical pickup or the magnetic head to a target track. Therefore, such an apparatus requires a motor for moving the optical head or pickup in a radial direction of the disk.

Problems, arising from the motor, such as distortion in characteristics including occurrence of mechanical resonance characteristics, changes of sensitivity (parameters), or disturbances due to vibrations and shocks, adversely affect control characteristics of the motor. To counteract these problems, some studies have been made.

For example, a study on control of joints of a robot, which intends to cope with the above-mentioned problems, is reported by Kohei Ohnishi (the Journal of the Institute of Electrical Engineers of Japan, Vol.110, No. 8, 1990, pp. 657–660).

According to the article, it is considered that deviation from the ideal characteristics and response of a motor due to characteristic distortion, parameter variations, vibrations or shocks is attributed solely to a disturbance torque applied to the motor. The article discloses a method utilizing a so-called disturbance observer, by which the disturbance torques are collectively estimated and fed back to the motor.

FIG. 36 is a block diagram illustrating the system utilizing the disturbance observer, and FIG. 37 is a block diagram illustrating the system which is equivalently re-drawn.

In FIG. 37, the right half configuration of a disturbance observer 513 is for obtaining entire torque $T_1$, which is applied to the motor 510, while the left half configuration is for obtaining a nominal value $T_2$ of driving torque $T_m$. The torque $T_1$, includes the driving torque $T_m$ and disturbance torque $T_{dis}$, and is obtained by (1) conducting approximate differential operation so as to convert a rotation velocity (angular velocity) ω of the motor 510, which is detected by a sensor, into an angular acceleration in the bandwidth whose upper angular frequency is g, and then (2) multiplying the angular acceleration by the amount of reduced gain g during the approximate differential operation and a nominal value $J_n$ of the moment of inertia J. The nominal value $T_2$ of the driving torque $T_m$ is obtained by multiplying drive current I of the motor 510 by a nominal value $K_{\tau n}$ of torque constant $K_\tau$.

The disturbance observer 513 obtains an estimated value $PT_{dis}$ of the disturbance torque $T_{dis}$ in accordance with the difference ($T_2-T_1$) and multiplies this difference by a reciprocal of the nominal value $K_\tau$ n of the torque constant $K_\tau$ so as to obtain a compensating current $I_{cmp}$ for canceling the above-described difference.

According to the system using the disturbance observer 513, the compensating current $I_{cmp}$ is added to a reference drive current $I_a{}^{ref}$ for the motor 510 so as to obtain an actual drive current I, and the actual drive current I is supplied to the motor 510 so as to suppress the affections in the motor 510 due to such as the various characteristic distortions, the parameter variations, the vibrations and shocks applied from outside. As a result, the transfer function from the reference drive current $I_a{}^{ref}$ to rotation angle θ is given as $K_{\tau n}/J_n \cdot s^2$ (s: Laplace operator), which is determined by the nominal values of the torque constant $K_\tau$ and the moment of inertia J.

FIGS. 36 and 37 indicate that the motor has a constant term D of viscosity. However, the disturbance observer 513 does not have a block which specifies it. Therefore, it is contained in the disturbance torque $T_{dis}$, and the disturbance torque $T_{dis}$ is suppressed, thereby never appearing.

The low-pass filter {g/(s+g)} in the left half configuration of the disturbance observer 513 is derived from the equivalent conversion. The low-pass filter has no affection at angular frequencies not higher than the angular frequency g, in which a signal is approximate-differentiated, while it affects on the bandwidth at angular frequencies higher than g.

The use of such a disturbance observer for controlling a motor, however, causes the following problem. When the motor or other elements driven by the motor are moved beyond the motion space and come into collisions, or when great shocks are applied to these elements, it is likely that the motor is greatly driven, thereby damaging the motor and the elements driven by the motor.

For example, it is assumed, in a machine with a structure such that an arm is rotated by a motor, that when the rotating arm is abruptly obstructed by, for example, collisions of the arm against a wall, this means for the arm and the motor that a disturbance acceleration (or a disturbance angular acceleration) is abruptly applied to them and obstruct their normal action. Accordingly, the disturbance observer further drives the motor so as to offset it, thereby causing the arm to be further forcibly pushed against the wall.

As a result, mechanical or electrical overload is given to the arm and the motor, and they are damaged in the worst case. This is not restricted to such collisions against a wall. Even when some great shocks happen to the motor or the arm, the disturbance observer also regards it as the shocks obstructing the normal motion of the motor, thereby causing the same phenomenon.

These problems are not unique to such a driving system utilizing a disturbance observer for driving a rotary motor, but are common to a driving system for driving a linear motor often utilized in an optical disk apparatus, as well as a swing motor for use in a magnetic disk apparatus. In addition, in an apparatus for recording and reproducing information, such as the optical disk apparatus or the magnetic disk apparatus, the motor moves minute and damageable elements such as the optical pickup or the magnetic head. Therefore, the affection of such a problem is necessarily great. Accordingly, it has been difficult to apply the disturbance observer to such an apparatus so as to control a motor, in spite of its preferable effects such as suppressing characteristic distortion of the motor and disturbances.

SUMMARY OF THE INVENTION

The present invention, which relates to a motor control device provided with a disturbance observer is made in the light of the following problems. When the motor or members driven by the motor is given a disturbance with an abnormal magnitude due to, for example, collisions at an end of the motion space, the disturbance observer further drives the motor so as to offset the disturbance, thereby causing the collisions to have a greater magnitude. Therefore, the object of the present invention is to provide a motor control device in which such a problem is solved and which does not cause the motor and the members driven by the motor to be damaged.

To achieve the above object, the motor control device in accordance with the present invention, is composed of (1) a driving circuit for generating the driving signal for driving the motor in response to an inputted signal, (2) a detecting circuit for detecting a condition of the motor, (3) a disturbance observer for outputting a signal for compensating a disturbance which shows a change in the condition of the motor, based on the condition of the motor detected by the detecting circuit and the driving signal for driving the motor, (4) a compensating circuit for compensating the driving signal for driving the motor based on the output of the disturbance observer, (5) a judging unit for judging whether or not the disturbance applied to the motor has an abnormal magnitude, and (6) an abnormal disturbance counteracting unit for restricting the driving of the motor based on the output of the judging unit when the disturbance has an abnormal magnitude.

According to the above arrangement, the detecting circuit, such as a velocity sensor or an acceleration sensor, usually detects velocity or acceleration of the motor. The disturbance observer computes a disturbance, which includes parameter variations, vibrations, and forces applied from outside, based on the output of the detecting circuit and the driving signal for driving the motor so as to output the signal for compensating the disturbance. The compensating circuit compensates the driving signal for driving the motor, based on the output of the disturbance observer. This enables the motor to suppress the affection of the disturbance such as parameter variations and vibrations, thereby causing the members driven by the motor to follow a target track.

On the other hand, when a disturbance with an abnormal magnitude is applied to the motor, for example, when the motor or the movable section of the motor is driven beyond the motion space and comes into collisions with a stopper, or when great shocks are given, the judging unit detects such abnormality based on, for example, the output of the detecting circuit or the output of the disturbance observer. In accordance with the output of the judging unit, the abnormal disturbance counteracting unit restricts the driving of the motor. This results in solving such a problem as the disturbance observer excessively drives the motor, for example, the disturbance observer further drives the motor so as to cause the collisions to have a greater magnitude. Therefore, it is preventible that the motor, the mechanism or the parts driven by the motor is damaged.

An arrangement which ensures that the abnormal disturbance counteracting unit restricts the driving of the motor can be varied in many ways. A first motor control device of the present invention is arranged so that an operation suspending unit for suspending the operation of the disturbance observer when abnormality occurs is provided in the abnormal disturbance counteracting unit. The operation suspending unit is realized by, for example, a cutoff circuit for cutting off the transmission of the driving signal, provided between the driving circuit and the compensating circuit through the disturbance observer, for cutting off the transfer of the driving signal. The cutoff circuit virtually stops the operation of the disturbance observer, resulting in that the above-mentioned effect can be achieved. Especially when the cutting off of the signal transfer is carried out by the cutoff circuit between the driving signal and the comparing circuit which computes a disturbance by comparing an actual value and an estimated value of the condition of the motor, the disturbance observer's operation of opposing or overcoming the disturbance is prevented, while only a negative feedback loop for feeding back the disturbance to the motor operates. As a result, the shocks are eased, therefore, this is more preferable.

According to the first arrangement, when the disturbance has an abnormal magnitude, the driving circuit drives the motor in accordance with an input from outside whereas the operation of the disturbance observer is suspended. This may cause the motor to be driven in a direction such that the collisions have a greater magnitude, thereby causing the motor and other parts to be damaged. In contrast, a second motor control device is arranged so that an operation suspending unit for suspending the driving of the motor when abnormality occurs is provided in an abnormal disturbance counteracting unit. Note that the operation suspending unit is realized by a cutoff circuit for cutting off, for example, an input to or an output from the driving circuit. As a result, when a disturbance with an abnormal magnitude is applied, the motor is suspended irrelevant to the input supplied to the driving circuit from outside. Thus, this arrangement more surely prevents damage on the motor and other parts, therefore it is more preferable.

The timing when the abnormal disturbance counteracting unit operates can be varied as well. It is preferable that the abnormal disturbance counteracting unit restricts the driving of the motor for a period of time while a disturbance with an abnormal magnitude is applied. In this case, the foregoing effect can be achieved with a simple arrangement. It is also preferable that the abnormal disturbance counteracting unit is provided with a timing control circuit for controlling the abnormal disturbance counteracting unit to restrict the driving of the motor in accordance with an output of the judging unit for a predetermined period of time since the disturbance with the abnormal magnitude starts. With this arrangement, when it is possible that disturbances such as collisions and great shocks sequentially occur, an excessive driving of the motor is prevented until the disturbances such as collisions and shocks are converged within an enough small range. Therefore, it is avoidable that the motor is excessively driven immediately after a disturbance is converged, thereby ensuring that damaging parts such as the motor is prevented. It is more preferable that the abnormal disturbance counteracting unit is provided with a timing control circuit for controlling the abnormal disturbance counteracting unit to restrict the driving of the motor in accordance with an output of the judging unit, for a period of time while the disturbance with the abnormal magnitude is applied and for a predetermined period of time since the disturbance becomes within the predetermined range. With this arrangement, even though shocks have been given for a long period of time, an excessive driving of the motor is prevented during a period of time while the abnormal disturbance is applied and while the abnormal disturbance is converged within an enough small range. Therefore, the damaging of parts can be more effectually prevented.

There are several ways how the judging unit judges whether or not abnormality occurs. It is preferable that the judging unit judges, in accordance with an output of the detecting circuit, whether a disturbance applied to the motor has an abnormal magnitude or not. In this case, since the judgement can be made based on acceleration caused by the disturbance such as collisions, it is easy to judge whether or not the disturbance has an abnormal magnitude. According to another preferable arrangement, the judging unit judges, in accordance with an output of the disturbance observer, whether a disturbance applied to the motor has an abnormal magnitude or not. In this case, abnormality is detected, not only when it is caused by collisions, but also when an excessive input for driving the motor is supplied from outside.

In addition, the detecting circuit is preferably an acceleration detecting circuit. With such an arrangement, the disturbance observer is not required to carry out differential operation inside. Therefore, an amplifier with a high gain proportional to a bandwidth for the differential operation is unnecessary in the configuration of the disturbance observer. This results in simplification of the circuit arrangement and reduction of affections of noises due to sensors and circuits. Furthermore, more flexibility is allowed in selecting a signal as a reference which the judging unit uses in judging whether abnormality occurs.

As to the arrangement of the acceleration detecting circuit, it is preferable that the acceleration detecting circuit includes an element for transducing quantity of distortion caused by an acceleration into an electric signal. Such an arrangement can be realized by using a piezoelectric element, therefore can be miniaturized. As a result, there are a fewer requisites to satisfy in setting such an acceleration detecting circuit. In addition, the space around the motor, where the acceleration detecting circuit is provided, can be reduced. According to another preferable arrangement, the acceleration detecting circuit includes an element for transducing quantity of mechanical distortion caused by acceleration into an electric signal for cancelling the mechanical distortion. Such an arrangement can be achieved, for example, as an integrated circuit incorporating peripheral circuits, using the micromachining technology. Therefore, the acceleration detecting circuit which is thus miniaturized, allows flexibility in its setting, and is less affected by noises, can be obtained.

It is more preferable that the acceleration detecting circuit detects a relative acceleration of the movable section of the motor to the stationary section of the motor. With such an arrangement, the acceleration detecting circuit accurately detects an acceleration of the movable section relative to the stationary section which is obtained when a reaction of the stationary section to the movable section during driving of the motor, vibrations, shocks, or the like are given. Therefore, the motor control device can more accurately control the motor.

It is still more preferable that the disturbance observer outputs a signal for compensating a change in the condition of the motor, based on the driving signal for driving the motor and an output of a relative acceleration computing circuit which computes a relative acceleration of the movable section to the stationary section of the motor, while the judging unit judges whether or not abnormality exists based on an output of the first acceleration detecting circuit for detecting an acceleration of the movable section of the motor. With such an arrangement, more appropriate control of the motor can be achieved, as is with the foregoing arrangement. In addition, since the judging unit judges whether or not abnormality occurs based on the acceleration applied to the movable section, the abnormality counteracting control unit operates only when the shocks or the like are actually given to the movable section. Therefore, when the disturbance such as vibrations and shocks are given to the whole device, the motor control device as a whole, including the disturbance observer, remains in the operating state. Consequently, the motor control device ensures that the motor control continues and that control errors are more quickly converged. In addition, after the disturbance is converged, the control is resumed immediately.

The motor control device is effectual when it controls a motor which is required to withstand shocks on the motor or parts driven by the motor and which requires high accuracy in the control. Therefore, the motor control device of the present invention is suitable particularly for controlling the motor moving an information recording/reproducing unit along a surface of a disk-type recording medium, the information recording/reproducing unit carrying out at least one of recording and reproducing of information with respect to the disk-type recording medium.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

In the following embodiments, no distinction is made between a voltage signal and a current signal unless necessary, and the two signals are regarded as equivalent in the descriptions.

The following description will discuss the first embodiment of the present invention, with reference to FIGS. 1 through 14.

This embodiment deals with how to control a swing motor for use in a magnetic disk apparatus.

Figure 2:
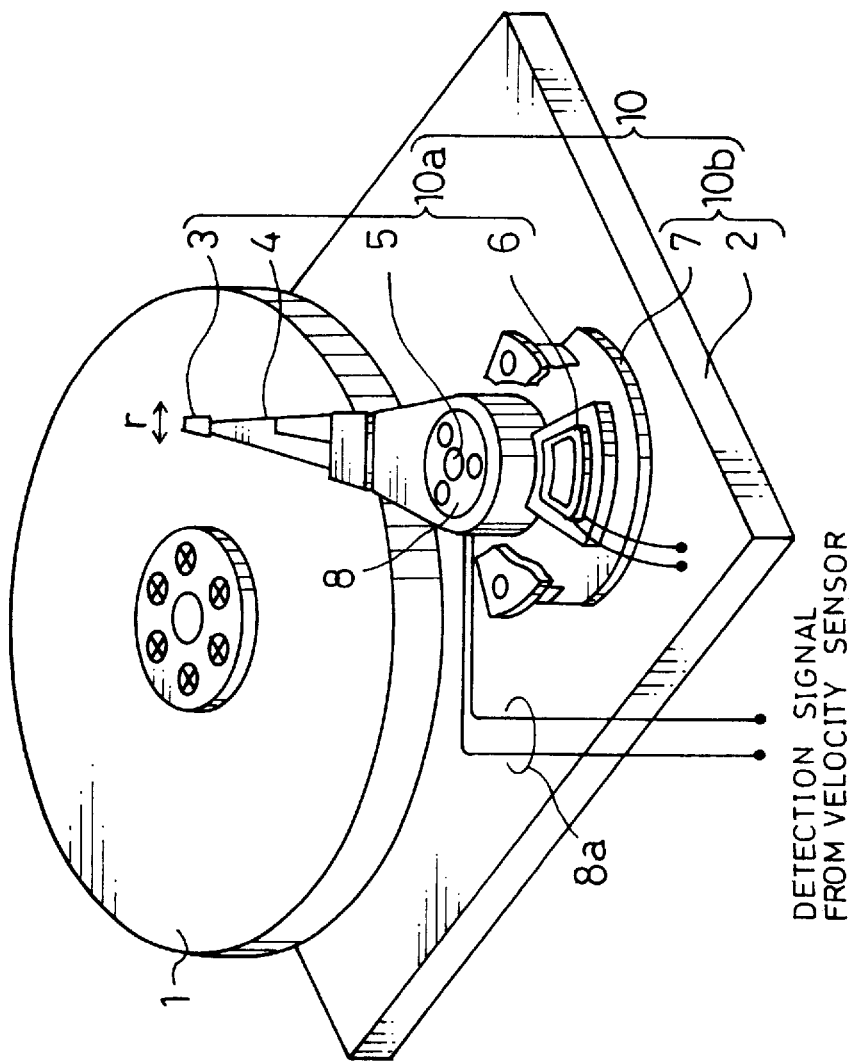
FIG. 2 is a perspective view illustrating an arrangement of an information recording and reproducing apparatus (a magnetic disk apparatus).

FIG. 2 illustrates a structure around the swing motor. A swing arm 4 provided with a head 3 revolves on an axis 5, thereby carrying out a positioning of the head 3 above a magnetic disk 1 in a radial direction of the magnetic disk 1, the magnetic disk 1 being rotated by a spindle motor (not shown). The swing arm 4 is driven by a mechanism called a swing motor 10. The swing motor 10 utilizes electromagnetic force for driving the swing arm 4. The electromagnetic force is generated between a driving coil 6 provided in the swing arm 4 and a permanent magnet 7 provided on a chassis 2 when a driving current is applied to the driving coil 6.

Note that a section of the swing motor 10 which is movably provided relatively to the chassis 2 is hereinafter referred to as a "movable section 10a", where necessary. On the other hand, a section of the swing motor 10 which is immovably provided relatively to the chassis 2 is referred to as a "stationary section 10b", where necessary. The movable part 10a includes the head 3 and the swing arm 4, while the fixed part 10b includes the permanent magnet 7 and the chassis 2.

The swing motor 10 is provided with a velocity sensor 8 for detecting a velocity (angular velocity) of the movable section 10a to the stationary section 10b of the swing motor 10. The output from the velocity sensor 8 is sent to a disturbance observer 13 (later described). Various types may be utilized as the velocity sensor 8, but adopted as the velocity sensor 8 shown in FIG. 2 is, for example, a unit based on the same principle as that of the D.C. generator, which utilizes the electromotive force generated on rotation of a coil in a magnetic field.

Figure 1:
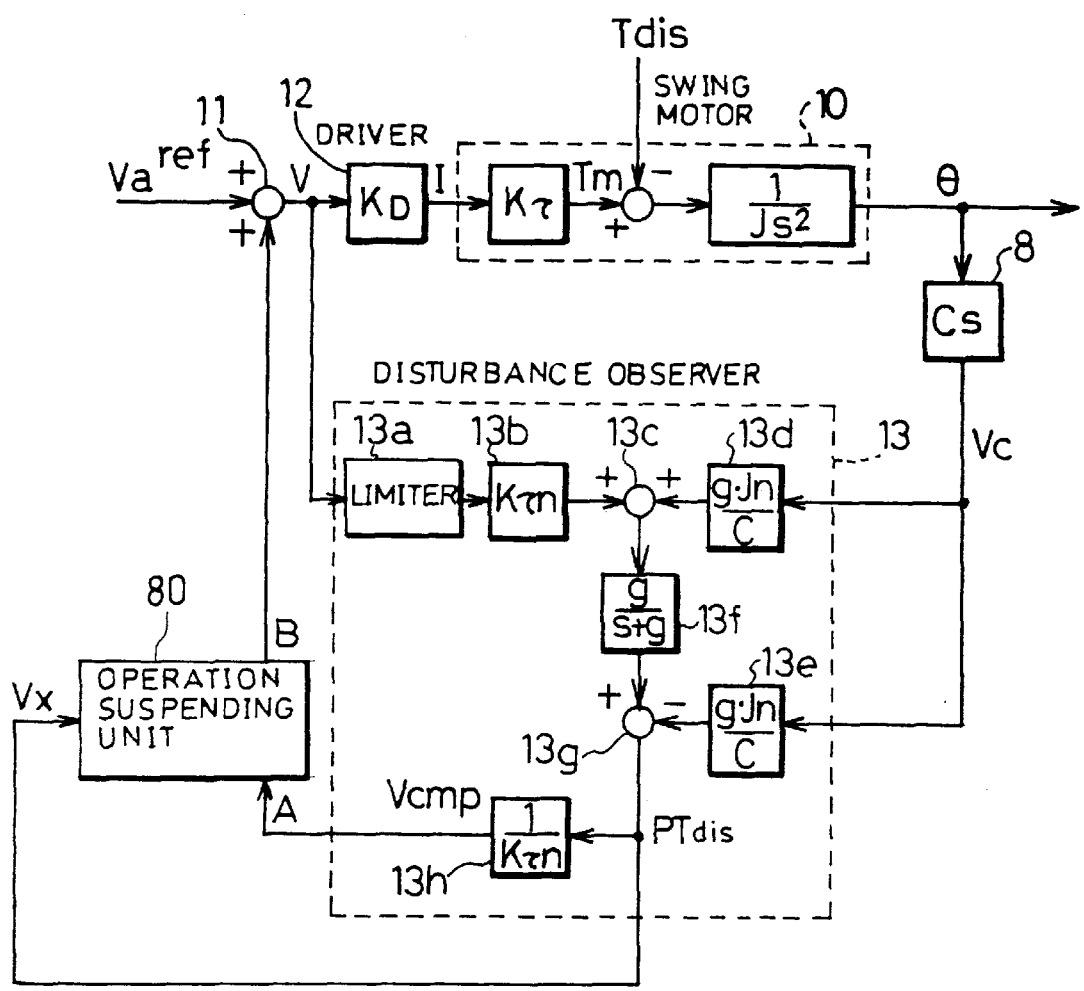
FIG. 1 is a block diagram illustrating a motor control device, in accordance with an embodiment of the present invention.

FIG. 1 is a block diagram illustrating a motor control device of the present embodiment, the motor control device including the disturbance observer.

A signal for driving the swing motor 10, i.e., a control objective of the motor control device, is supplied as a reference signal $V_a^{ref}$ to an adder 11 from a separate unshown controller (for example, servo error signal generating means or a microcomputer), and an output V of the adder 11 is sent to a driver 12 and the disturbance observer 13 respectively. The driver 12 converts the voltage V (unit: V) into a current I (unit: A) whose absolute value is equal to that of the voltage V, and supplies it to the swing motor 10. Note that the maximum capacity of supply is $\pm I_{max}$.

The swing motor 10 as a control objective is represented as a two-stage integral system relating to the torque constant $K_\tau$ and the moment of inertia J of the rotary section. It is considered that all disturbances such as friction, viscosity, parameter variations, and vibration, are contained in the disturbance torque $T_{dis}$ and the disturbance torque $T_{dis}$ is applied to the swing motor 10.

The velocity sensor 8 detects the output velocity (angular velocity) of the swing motor 10, and sends it to the disturbance observer 13. In FIG. 1, since the output of the swing motor 10 is represented as a rotation angle θ, the velocity (angular velocity) sensor 8 detects differential of the rotation angle θ. Therefore, the velocity sensor 8 is represented as Cs, which is obtained by multiplying detected sensitivity C of the velocity sensor 8 by the Laplace operator s indicating the differential operation.

Among the signals supplied to the disturbance observer 13, the signal V from the adder 11 is sent to an amplifier 13b which has a gain $K_{\tau n}$, through a limiter 13a for limiting the maximum amplitude of the drive voltage signal V at or below a predetermined level. An output of the amplifier 13b is sent to one input terminal of an adder 13c.

A signal $V_c$ supplied to the disturbance observer 13 by the velocity sensor 8 is sent respectively to amplifiers 13d and 13e, each of which has a gain $(g \cdot J_n/C)$. Note that g represents the upper limit angular frequency (cut-off angular frequency) of a bandwidth, in which the signal is approximate-differentiated so as to convert a velocity (angular velocity) signal (described later) to an acceleration (angular acceleration) signal. $J_n$ represents the nominal value of the moment of inertia J of the movable section 10a of the swing motor 10. The sensitivity C of the velocity sensor 8 is cancelled as a result by the respective outputs of the amplifiers 13d and 13e. Therefore, the outputs of the amplifiers 13d and 13e are obtained by multiplying the output velocity (angular velocity) of the swing motor 10 by $(g \cdot J_n)$.

An output of the amplifier 13d is sent to the other input terminal of the above-mentioned adder 13c. An output of the adder 13c is sent, through a low pass filter 13f which has a unity gain at low frequencies and a cut-off angular frequency g, to a positive input terminal of a subtracter 13g. The output of the amplifier 13e is sent to a negative input terminal of the subtracter 13g.

As a result, the subtracter 13g outputs a value $PT_{dis}$ estimating the entire disturbance torque, which includes the differences between the parameters $K_\tau$, J and the nominal values $K_{\tau n}$, $J_n$, respectively, as well as the disturbance torque $T_{dis}$. The estimated entire disturbance torque $PT_{dis}$ is converted by an amplifier 13h into a compensating voltage signal $V_{cmp}$ for compensating $PT_{dis}$. The amplifier 13h has a gain $(1/K_{\tau n})$, i.e., the reciprocal of the nominal value $K_{\tau n}$ of the torque constant $K_\tau$. The compensating voltage signal $V_{cmp}$ is sent to the adder 11.

Between the amplifier 13h and the adder 11, there is provided an operation suspending unit 80. When the output of the subtracter 13g becomes a predetermined level, the operation suspending unit 80 judges that an excessive input reference voltage $V_a^{ref}$ or an excessive disturbance due to shocks of collisions is applied. In such a case, the operation suspending unit 80 suspends the supply of the output (the compensating voltage $V_{cmp}$) of the amplifier 13h to the adder 11.

The following description will depict the principles of the operation of the disturbance observer. Without considering the existence of the operation suspending unit 80 in FIG. 1, transfer function between the input values V and Vc supplied to the disturbance observer 13 and the estimated total disturbance torque $PT_{dis}$ is given as Equation (4) below:

$$PT_{dis} = K_{\tau n} \times \{g/(s+g)\} \cdot V - (g \cdot J_n/C) \times \{s/(s+g)\} \cdot V_c \quad (4)$$

Figure 3:
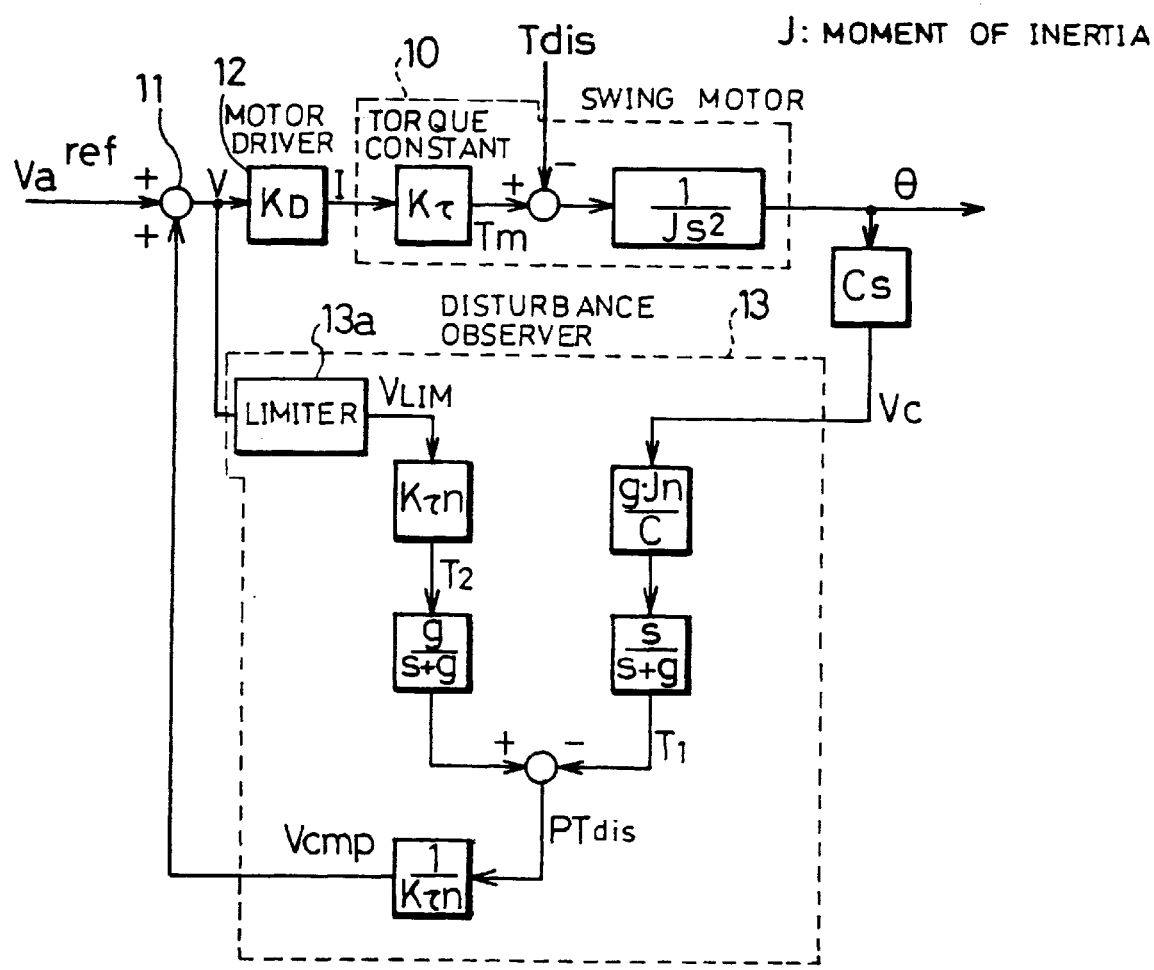
FIG. 3 is a block diagram illustrating the motor control device, with a disturbance observer redrawn by an equivalent conversion.

Therefore, FIG. 1 can be re-drawn into FIG. 3. As shown in FIG. 3, in the left half configuration of the disturbance observer 13, the following operation is carried out. Based on the signal V sent from the adder 11 to the disturbance observer 13, torque $T_2$ when the torque constant of the swing motor 10 is in accordance with the nominal value $K_{\tau n}$ is obtained, and the band control is carried out to the torque $T_2$ by a low-pass filter which has a transfer function of $\{g/(s+g)\}$. On the other hand, in the right half configuration of the disturbance observer 13, the following operation is carried out. The signal $V_C$ from the velocity sensor 8 is multiplied by the gain $(g \cdot J_n/C)$, and thereafter the signal $V_C$ is approximate-differentiated in the bandwidth whose upper limit angular frequency is g by the high-pass filter which has transfer function of $\{s/(s+g)\}$. Therefore, considering that $s/(s+g)$ is nearly equal to $s/g$, the operation on signal components which are contained in the signal $V_c$ and not higher than the angular frequency g is given as Equation (5) below:

$$(g \cdot J_n/C) \cdot (s/g) = J_n \cdot s/C \quad (5)$$

Here, the denominator C on the right hand side of Equation (5) cancels the sensitivity of the velocity sensor 8. The velocity (angular velocity) of the swing motor 10 is differentiated, so as to obtain an angular acceleration, and the angular acceleration is multiplied by the nominal value $J_n$ of the moment of inertia J. Thus, the right half configuration of the disturbance observer 13 estimates an entire torque $T_1$ applied to the movable section 10a of the swing motor 10 under the condition where the moment of inertia J is coincident with the nominal value $J_n$, the entire torque $T_1$ including the disturbance torque $T_{dis}$ and an actual driving torque $T_m$ in accordance with the drive current I.

The effect of the disturbance observer will be described in the following depiction, with reference to FIG. 3. According to (1) the transfer function between the reference drive current $V_a^{ref}$ and the rotation angle θ of the swing motor 10 and (2) the transfer function between the disturbance torque $T_{dis}$ and the rotation angle θ of the swing motor 10, the following equations are obtained:

$$\theta = (1/Js^2)(K_\tau \cdot V - T_{dis}) \quad (6)$$

$$V_{cmp} = \{K_{\tau n} \cdot V - J_n \cdot s^2 \cdot \theta\}/K_{\tau n} \quad (7)$$

$$V = V_a^{ref} + V_{cmp} \quad (8)$$

Note that these equations are only concerned with angular frequency components s of not higher than the frequency g. Therefore, the equations are obtained under the condition where the transfer functions of the high-pass filter and the low-pass filter satisfy $\{s/(s+g)\} \simeq s/g$, and $\{g/(s+g)\} \simeq 1$, respectively.

With the substitution of Equation (7), Equation (8) is rearranged as:

$$V = \{(K_{\tau n}/J_n)/(K_\tau/J)\} \cdot V_a^{ref} + (1/K_\tau) \cdot T_{dis} \quad (9)$$

With the substitution of Equation (9), Equation (6) is rearranged as:

$$\begin{aligned}\theta &= \{K_\tau/(J \cdot s^2)\} \times \{(K_{\tau n}/J_n)/(K_\tau/J)\} \cdot V_a^{ref} + \\ &\quad \{K_\tau/(J \cdot s^2 \cdot K_\tau)\} \cdot T_{dis} - \{1/J \cdot s^2\} \cdot T_{dis} \\ &= \{K_{\tau n}/(J_n \cdot s^2)\} \cdot V_a^{ref}\end{aligned} \quad (10)$$

As clear from Equation (10), the relation between the rotation angle θ of the swing motor 10 and the reference drive voltage $V_a^{ref}$ is determined by the respective nominal values $K_{\tau n}$ and $J_n$ of the torque constant $K_\tau$ and the moment of inertia J. Since the both nominal values $K_{\tau n}$ and $J_n$ are specified as the amplifiers' gains in the disturbance observer 13, the rotation angle θ of the swing motor 10 is not affected by the parameters of the actual swing motor 10, such as $K_\tau$, J, and the disturbance torque $T_{dis}$.

Taking into consideration a constant term D of viscosity of the swing motor 10, Equation (6) is rearranged into Equation (11) below.

$$\theta = \{1/(Js^2 + Ds)\} \times (K_\tau \cdot V - T_{dis}) \quad (11)$$

Note that the result of this equation is the same as that of Equation (10), showing that the rotation angle θ of the swing motor 10 is not affected by the parameters of the actual swing motor 10.

The following description will discuss respective examples of actual circuit arrangements of the respective elements (blocks).

Figure 4:
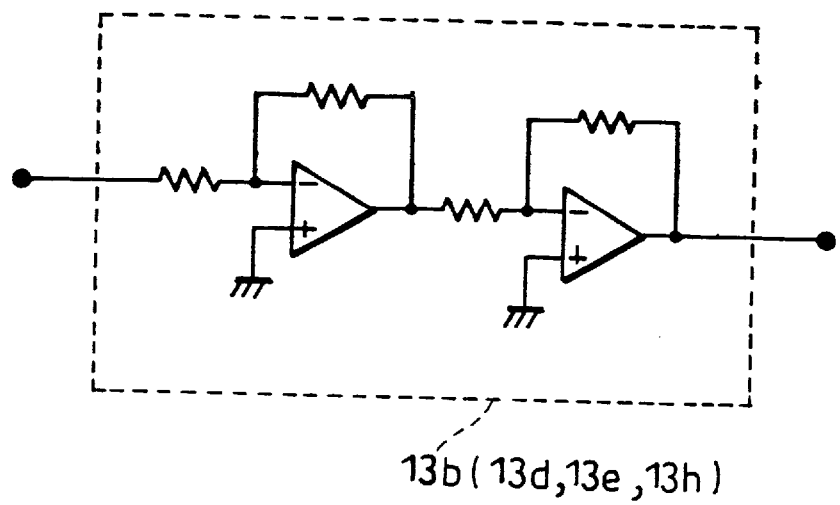
FIG. 4 is a circuit diagram illustrating an example of an electronic circuit arrangement of a block (amplifier) of the disturbance observer.

A block simply required to have a certain gain (such as the amplifiers 13b, 13d, 13e, and 13h in FIG. 1) is realized by, for example, two OP amplifiers in series, each OP amplifier carrying out inverting amplification (see FIG. 4). Each resistance value is set so as to obtain a desirable gain in total.

Figure 5:
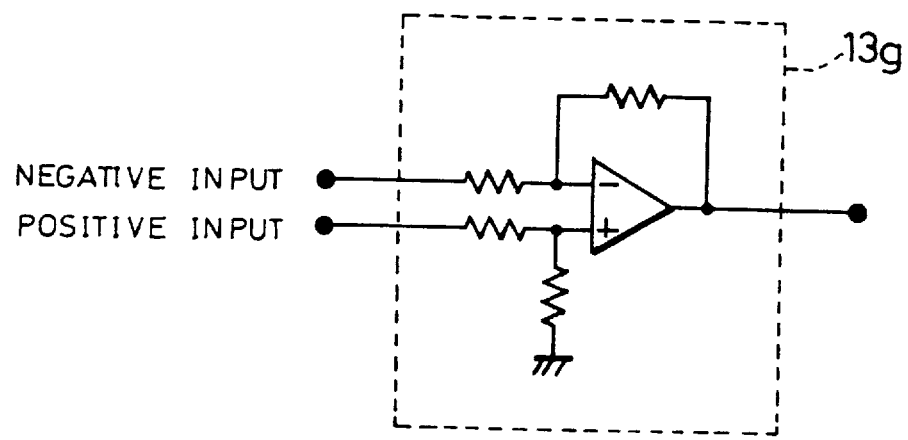
FIG. 5 is a circuit diagram illustrating an example of an electronic circuit arrangement of a subtracter of the disturbance observer.

A subtracter such as the subtracter 13g is realized, for example, by a differential amplifier circuit incorporating an OP amplifier as shown in FIG. 5.

Figure 6:
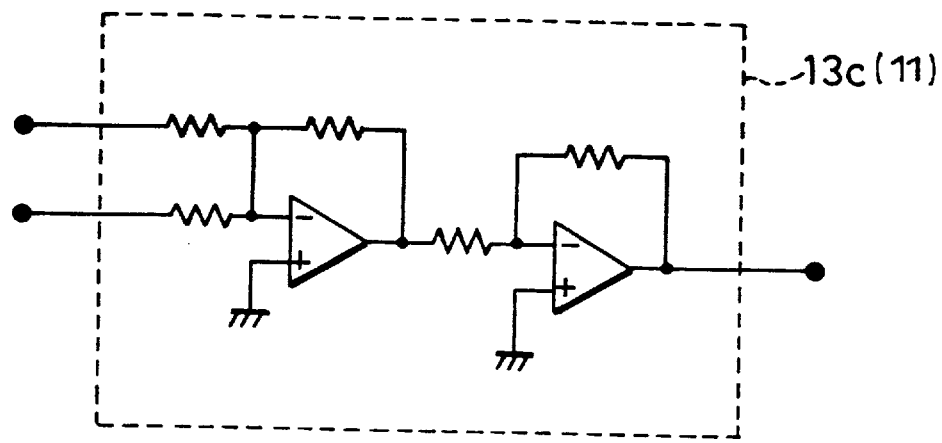
FIG. 6 is a circuit diagram illustrating an example of an electronic circuit arrangement of an adder of the disturbance observer.

An adder such as the adders 13c and 11 is realized, for example, by an inverting adder circuit and an inverting amplifier circuit connected in series as shown in FIG. 6. Each circuit incorporates an OP amplifier.

A low-pass filter such as the low-pass filter 13f is realized by a voltage follower incorporating an OP amplifier and a first-order RC low-pass filter connected to an input terminal of the voltage follower. The first-order RC low-pass filter is made up of a resistor R and a capacitor C. Given the upper limit angular frequency g of the control bandwidth, the resistor R and the capacitor C are set so as to have values satisfying the equation:

$$\{1/(R \cdot C)\} = g$$

Figure 8:
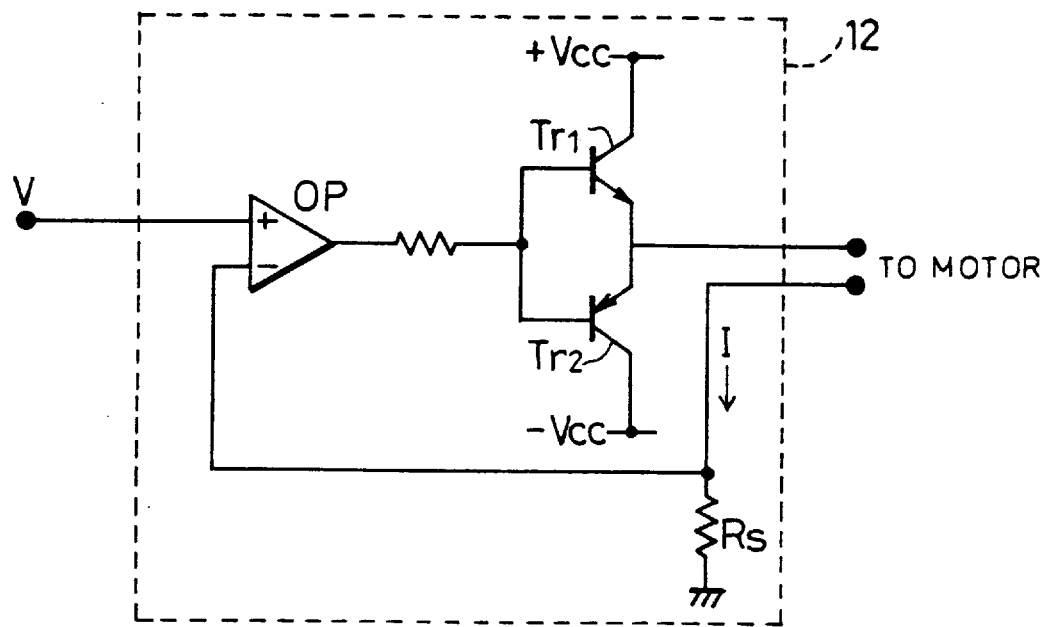
FIG. 8 is a circuit diagram illustrating an example of an electronic circuit arrangement of a driver (driving means) of the motor control device.

The driver 12 is realized, for example, by an OP amplifier OP, power transistors $T_{r1}$, and $T_{r2}$, and other elements as shown in FIG. 8. In such a circuit, the conversion factor $K_D$ [A/V] between the drive voltage signal V and the drive current signal I is equal to the reciprocal of the current detecting resistance $R_S$, i.e., $K_D = 1/R_S$.

Figure 9:
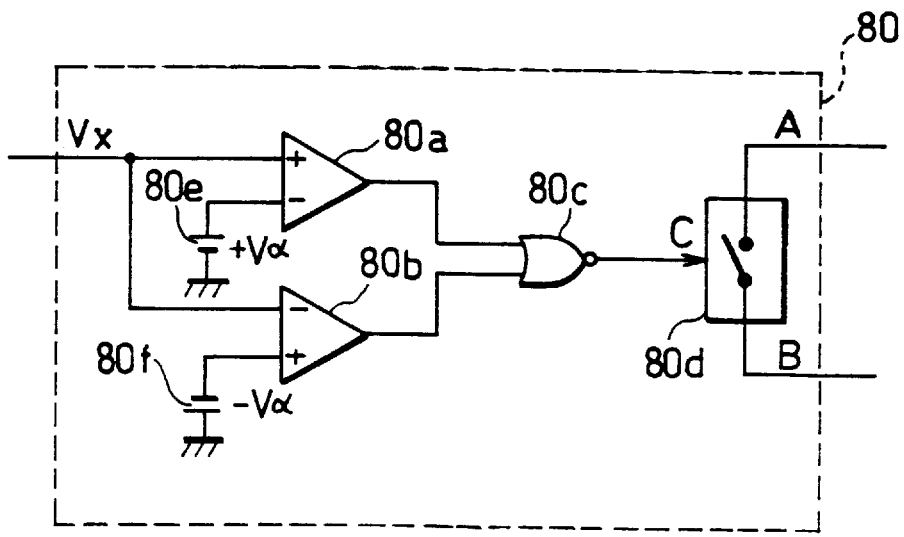
FIG. 9 is a circuit diagram illustrating an example of an electronic circuit arrangement of an operation suspending unit.

The operation suspending unit 80 is, as shown in FIG. 9, realized by comparators 80a and 80b, an NOR gate 80c, a switch 80d, and reference voltage sources 80e and 80f outputting positive and negative voltages $+V_\alpha$ and $-V_\alpha$ respectively. The non-inverting input terminal of the comparator 80a and the inverting input terminal of the comparator 80b are both supplied with a judgement objective signal $V_x$. The inverting input terminal of the comparator 80a is connected with the reference voltage source 80e outputting positive voltage $+V_\alpha$, while the non-reversing input terminal of the comparator 80b is connected with the reference voltage source 80f outputting negative voltage $-V_\alpha$. The outputs from the two comparators are sent to the NOR gate 80c, and the output of the NOR gate 80c is sent to a control terminal C of the switch 80d. An input terminal A and an output terminal B of the operation suspending unit 80 are connected each other by the switch 80d (ON state of the switch 80d) when the signal supplied to the control terminal C has a logical level of 1, while disconnected (OFF state of the switch 80d) when the signal has a logical level of 0.

When the signal $V_x$ supplied to both the comparators 80a and $80_b$ falls within a range between $+V_\alpha$ and $-V_\alpha$, the comparators 80a and 80b output a logical level of 0, respectively. Accordingly, the NOR gate 80c outputs a logical level of 1, thereby causing the switch 80d to be in the ON state. In contrast, when the signal $V_x$ is more than $+V_\alpha$ or less than $-V_{60}$, either of the outputs of the comparators 80a and 80b is a logical level of 1. Therefore, the output of the NOR gate 80c is a logical level of 0, thereby causing the switch 80d to be in the OFF state.

Suppose that great shocks are given to the swing motor 10 in operation when the disturbance observer 13 operates. In response to such great shocks, the disturbance observer 13 sends a signal so as to drive the swing motor 10. The signal changes depending on the strength of the shocks and the reference drive voltage signal $V_a^{ref}$.

The judgement objective signal $V_x$ in the present embodiment, which is sent to the operation suspending unit 80, is the output of the subtracter 13g in the disturbance observer 13, that is, the estimated value $PT_{dis}$ of the disturbance torque. When the $V_x$ exceeds a predetermined level, it is judged that collisions occurred. Then, the operation suspending unit 80 makes the switch 80d be in the OFF state so as to make the input terminal A and the output terminal B disconnected, thereby suspending the supply of the output of the amplifier 13h, i.e., the compensating voltage $V_{cmp}$, to the adder 11. As a result, the disturbance observer 13 has no influence on the control of the swing motor 10. Therefore, even when excessive shocks due to such as collisions lead to a reaction of the disturbance observer for opposing such shocks, it is avoidable that the motor is further driven, due to such a reaction of the disturbance observer 13, to come into still greater collisions. Thus, damaging the motor and the elements driven by the motor is prevented.

Note that the voltages $+V_\alpha$ and $-V_\alpha$ of the reference voltage sources in the operation suspending unit 80 are set substantially equal to or greater than a signal level corresponding to the maximum torque of the motor 10 in its normal operation, for example, 1.5 times to several times. With this setting, no influence is given on the usual operation of the motor, while its operation is adequately suspended when excessive shocks such as collisions occurs.

The following description will discuss several arrangements of the operation suspending unit 80 other than the arrangement shown in FIG. 9.

Figure 10:
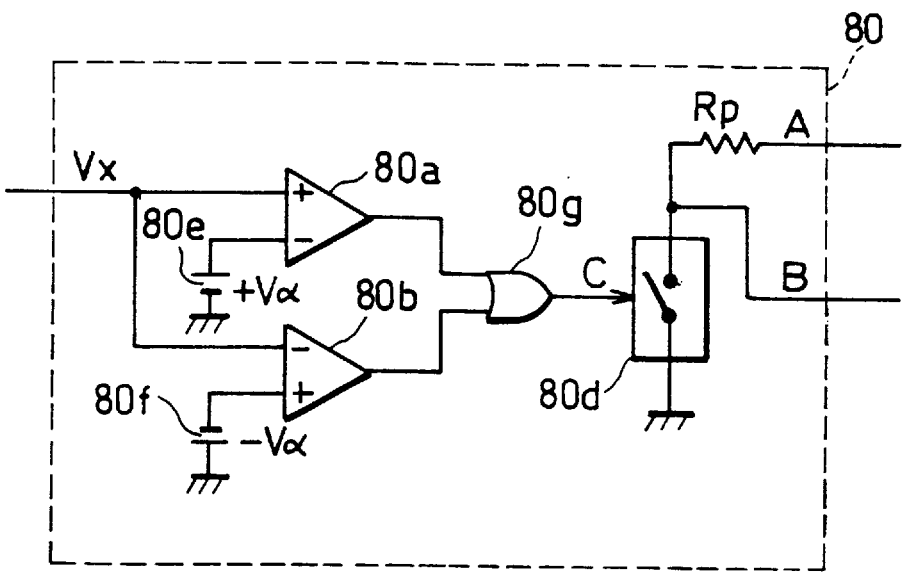
FIG. 10 is a circuit diagram illustrating another example of the electronic circuit arrangement of the operation suspending unit.

FIG. 10 illustrates one of the arrangements of the operation suspending unit 80. According to the arrangement, the supply of the signal from the input terminal A to the output terminal B is cut off, not by the OFF state of the switch, but by grounding the signal from the input terminal A through a resistor $R_p$ and the switch 80d. While the judgement objective signal $V_x$ is greater than $+V_\alpha$ or lower than $-V_\alpha$, either the comparator 80a or the comparator 80b outputs a logical level of 1. Since the outputs from the comparators are sent not to the NOR gate 80c but to an OR gate 80g, the switch 80d is supplied with a logical level of 1 from the OR gate 80g so as to become in the ON state. As a result, the signal of the input terminal A is grounded through the resistor $R_p$ and the switch 80d, thereby resulting in that the signal of the input terminal A is not sent to the output terminal B. Note that if the input terminal A is directly grounded through the switch 80d, amplifiers and the switch 80d may be supplied with an excessive current and go damaged. The resistor $R_p$ is provided as a protective resistor so as to prevent such damage.

Figure 11:
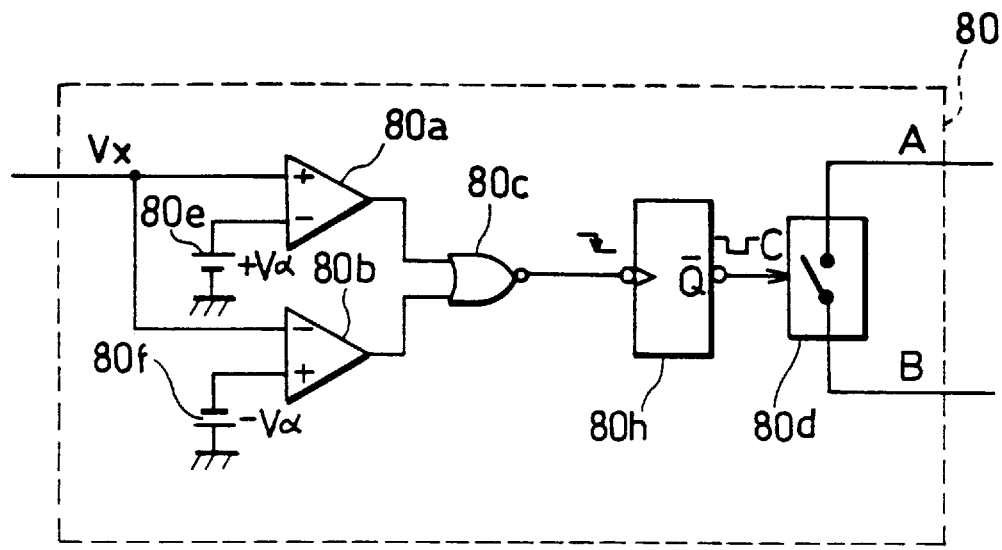
FIG. 11 is a circuit diagram illustrating a further example of the electronic circuit arrangement of the operation suspending unit.
Figure 12:
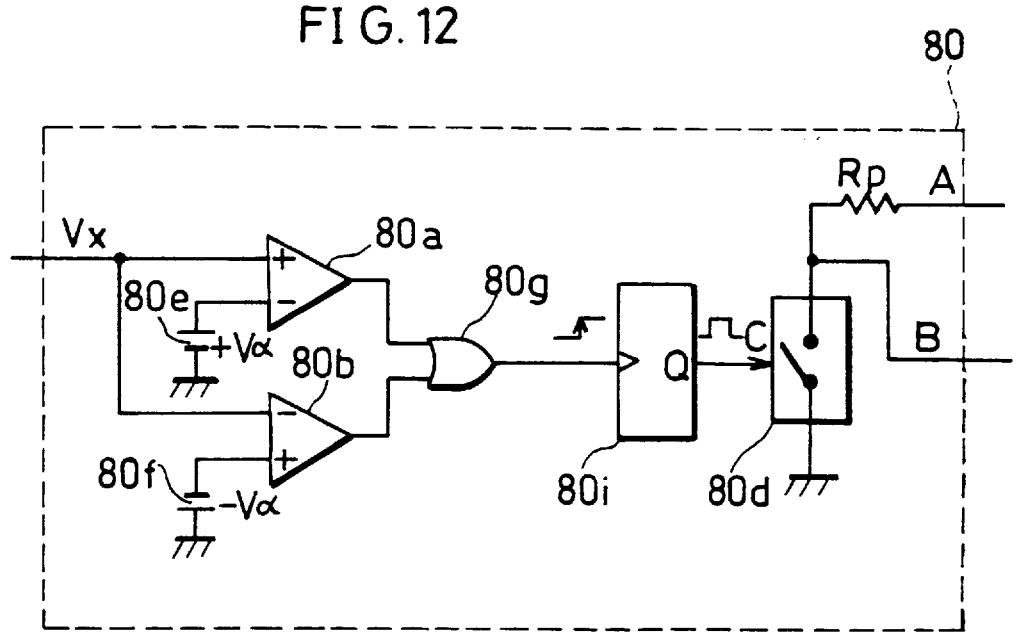
FIG. 12 is a circuit diagram illustrating still a further example of the electronic circuit arrangement of the operation suspending unit.

FIGS. 11 and 12 illustrate a further arrangements of the operation suspending unit 80. According to the arrangement shown in FIG. 11, an operation suspending unit 80 has the same configuration as that shown in FIG. 9, except for a monostable multivibrator 80h which sends a signal with a logical level of 0 to the control terminal C of the switch 80d for a predetermined period of time since a transition of the output of the NOR gate 80c from a logical level 1 to a logical level 0. According to the arrangement shown in FIG. 12, an operation suspending unit 80 has the same configuration as that shown in FIG. 10, except for a multivibrator 80i which sends a signal with a logical level 1 to the control terminal C of the switch 80d for a predetermined period of time since a transition of the output of the OR gate 80g from a logical level 0 to a logical level 1.

When the operation suspending unit 80 is in accordance with either of the arrangements shown in FIGS. 9 and 10, the operation by the disturbance observer 13 is virtually suspended during a period of time while the judgement objective signal $V_x$ indicating the strength of collisions or shocks is not within the range between $-V_\alpha$ and $+V_\alpha$, but it is resumed immediately after the judgement objective signal $V_x$ becomes within the above-mentioned range. The operation suspending unit 80 in accordance with such an arrangement usually functions sufficiently so as to prevent an excessive drive of the motor. However, with the foregoing arrangements, the sequence of steps (1) through (7) presented below may be repeated in the worst case, resulting in an intermittent driving of the motor and collisions.

(1) A collision occurs, thereby causing $V_x$ to go beyond the range between $+V_\alpha$ and $-V_\alpha$.

(2) The operation of the disturbance observer is suspended.

(3) An excessive driving of the motor is stopped, thereby relieving shocks of the collision.

(4) $V_x$ becomes within the range between $+V_\alpha$ and $-V_\alpha$.

(5) The operation of the disturbance observer resumes, while the shocks still remain to some extent.

(6) The disturbance observer drives the motor so as to oppose the remaining shocks.

(7) This causes another collision.

In contrast, with the arrangements shown in FIGS. 11 and 12, the operation of the disturbance observer is suspended since the judgement objective signal $V_x$ goes beyond the range between $+V_\alpha$ and $-V_\alpha$ for a predetermined period of time in which shocks due to collisions or a disturbance are to be settled to an adequate level. Therefore, the foregoing arrangements, thus ensuring to break up the sequence of the above 7 steps, are preferable.

Figure 13:
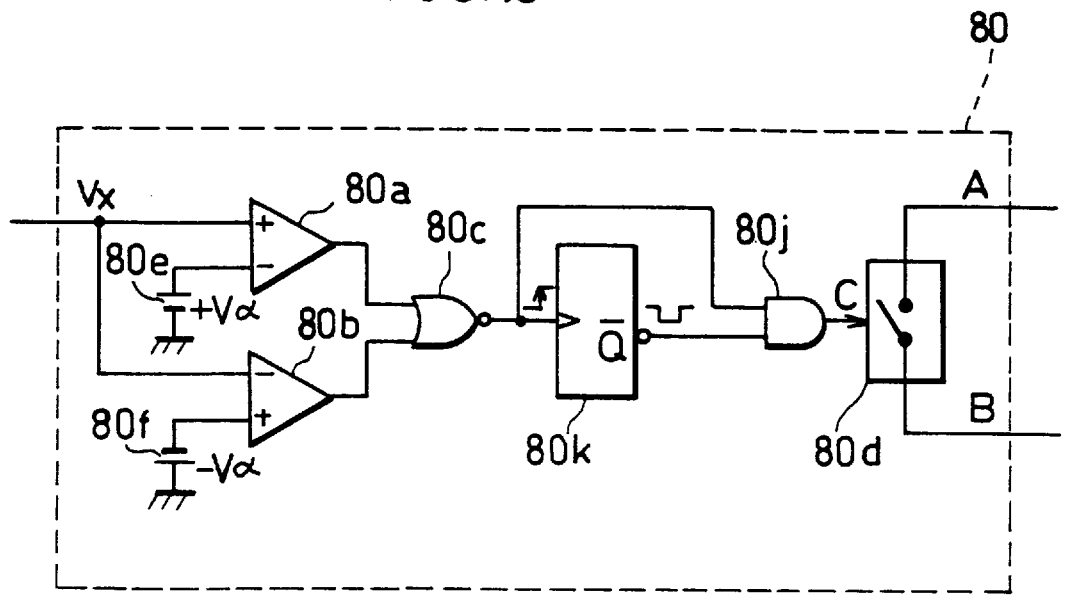
FIG. 13 is a circuit diagram illustrating another example of the electronic circuit arrangement of the operation suspending unit.
Figure 14:
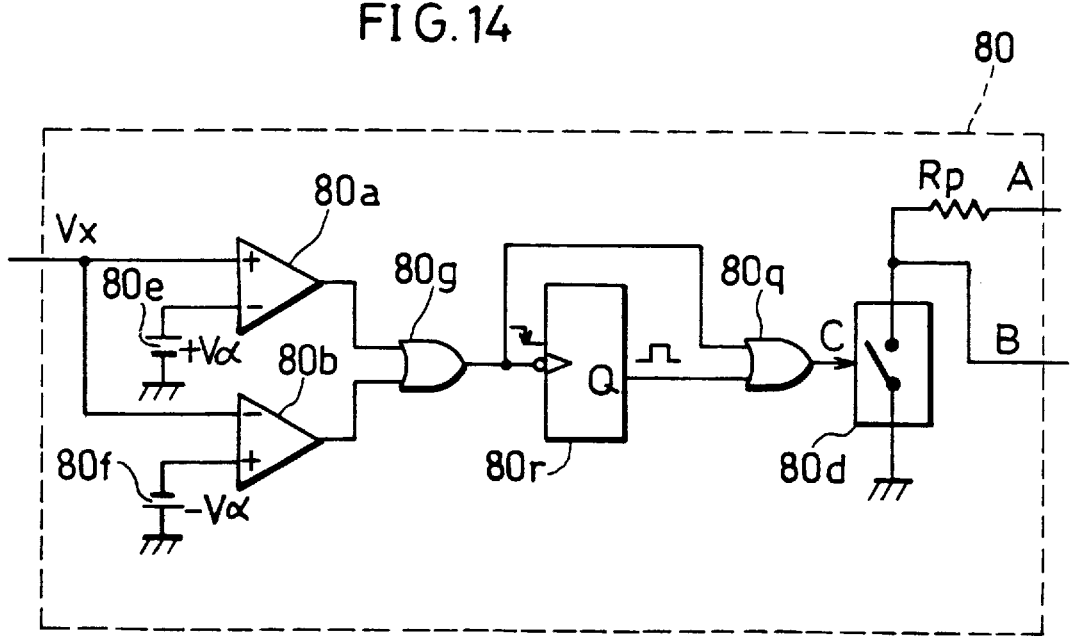
FIG. 14 is a circuit diagram illustrating a further example of the electronic circuit arrangement of the operation suspending unit.

FIGS. 13 and 14 illustrate still further arrangements of the operation suspending unit 80. According to the arrangement shown in FIG. 13, an operation suspending unit 80 has the same configuration as that shown in FIG. 11, except that an AND gate 80j is added between the NOR gate 80c and the control terminal C of the switch 80d and that a monostable multivibrator 80k is provided instead of the monostable multivibrator 80h. One of the input terminals of the AND gate 80j is connected with the output terminal of the NOR gate 80c. The other input terminal is connected with the output terminal of the monostable multivibrator 80k, which outputs a signal with a logical level of 0 for a predetermined period of time since a transition of the output of the NOR gate 80c from a logical level 0 to a logical level 1. The AND gate 80j outputs a logical level of 0 when the judgement objective signal $V_x$ is out of the range between $+V_\alpha$ and $-V_\alpha$, since the NOR gate 80c outputs a logical level of 0 in this case. As a result the switch 80d becomes in the OFF state. Even after the judgement objective signal $V_x$ becomes within the foregoing range, causing the NOR gate 80c to output a logical level of 1, the switch 80d further remains in the OFF state for the predetermined period of time since then. Thus, the supply of the signal from the input terminal A to the output terminal B is suspended during the above-described period.

According to the arrangement shown in FIG. 14, an operation suspending unit 80 has the same configuration as that shown in FIG. 12, except that a second OR gate 80q is added between the OR gate 80g (a first OR gate 80g) and the control terminal C of the switch 80d and that a monostable multivibrator 80r is provided instead of the monostable multivibrator 80i. One of the input terminals of the second OR gate 80q is directly connected with the output terminal of the first OR gate 80g. The other input terminal of the second OR gate 80g is connected with an output terminal of the monostable multivibrator 80r, which outputs a signal with a logical level of 1 for a determined period of time since a transition of the output of the OR gate 80g from a logical level 1 to a logical level 0. With such an arrangement, while the judgement objective signal $V_x$ is out of the range between $+V_\alpha$ and $-V_\alpha$, the second OR gate 80q outputs a logical level of 1 because the first OR gate 80g outputs a logical level of 1. As a result, the switch 80d becomes in the ON state. The switch 80d has remained in the ON state for a predetermined period since $V_x$ becomes within the foregoing range, so that the first OR gate 80g outputs a logical level of 0. As the switch 80d is in the ON state, a signal sent from the input terminal A is grounded through the protective resistor $R_p$ and the switch 80d. Thus, the supply of the signal to the output terminal B is suspended for the above-described period.

With the arrangements shown in FIGS. 13 and 14, the operation suspending unit 80 suspends the operation of the disturbance observer 13, during the period while the judgement objective signal $V_x$ is out of the range between $+V_\alpha$ and $-V_\alpha$ and the predetermined period of time since the judgement objective signal $V_x$ becomes within the range. As a result, even if shocks due to collisions or a disturbance continue for a long time, an excessive driving of the motor is avoided (1) for a period while the shocks continue and (2) for a predetermined period after the shocks are expected to be settled down to a predetermined level until it is settled down to a further adequate lower level. Therefore, this arrangement is more effectual than the other above-mentioned arrangements.

Figure 15:
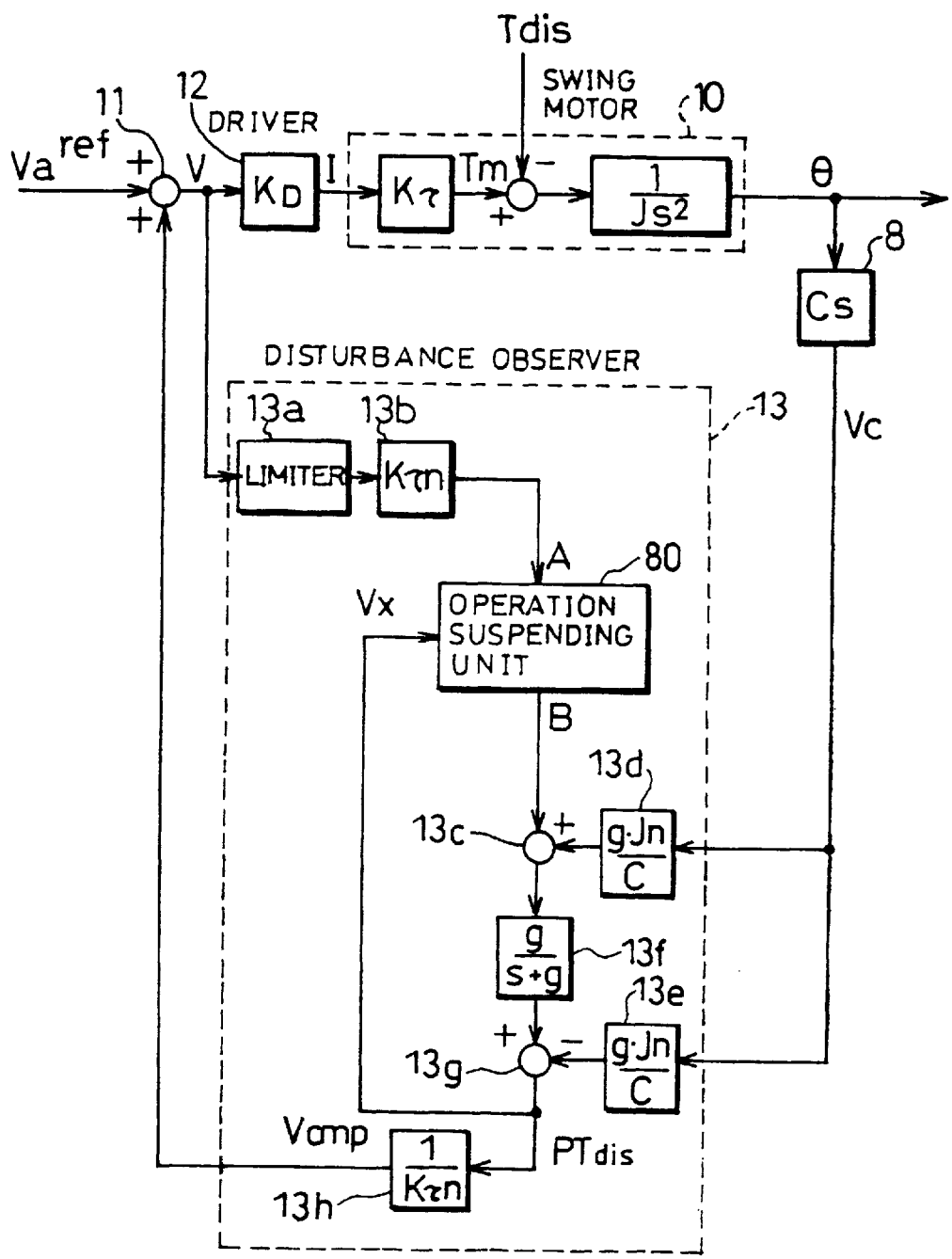
FIG. 15 is a block diagram illustrating a variation of the motor control device.

When, instead of the output $PT_{dis}$ of the subtracter 13g, the output $V_{cmp}$ of the amplifier 13f is used as the judgement objective signal $V_x$ in the above-mentioned various operation suspending units 80, the output $V_{cmp}$ contains signal components of a disturbance acceleration caused by shocks or the like, thereby resulting in that the same effect as that of the present embodiment is achieved. Furthermore, the signal transfer may be cut off at any point by the operation suspending unit 80 as long as the cut-off point falls on the positive feedback loop inside the disturbance observer and but not on the negative feedback loop; for example, at the point between the amplifier 13b with the gain $K_{vn}$ and the adder 13c, as shown in FIG. 15. In this case, the operation suspending unit 80, during operation, cuts off the positive feedback loop, thereby suspending the function of opposing or overcoming a disturbance. Thus, the operation suspending unit 80 causes a virtual suspension of the disturbance observer's operation. As a result, the negative feedback loop which simply feeds back a disturbance such as shocks to the motor 10 functions alone, thereby achieving an effect of relieving the shocks. Therefore, this arrangement is more preferable.

[Second Embodiment]

The following description will discuss the second embodiment of the present invention, with reference to figures. A motor control device of the second embodiment controls a linear motor for use in an optical disk apparatus, and not a velocity sensor but an acceleration sensor is adopted as a sensor for detecting the motion of the linear motor.

Figure 16:
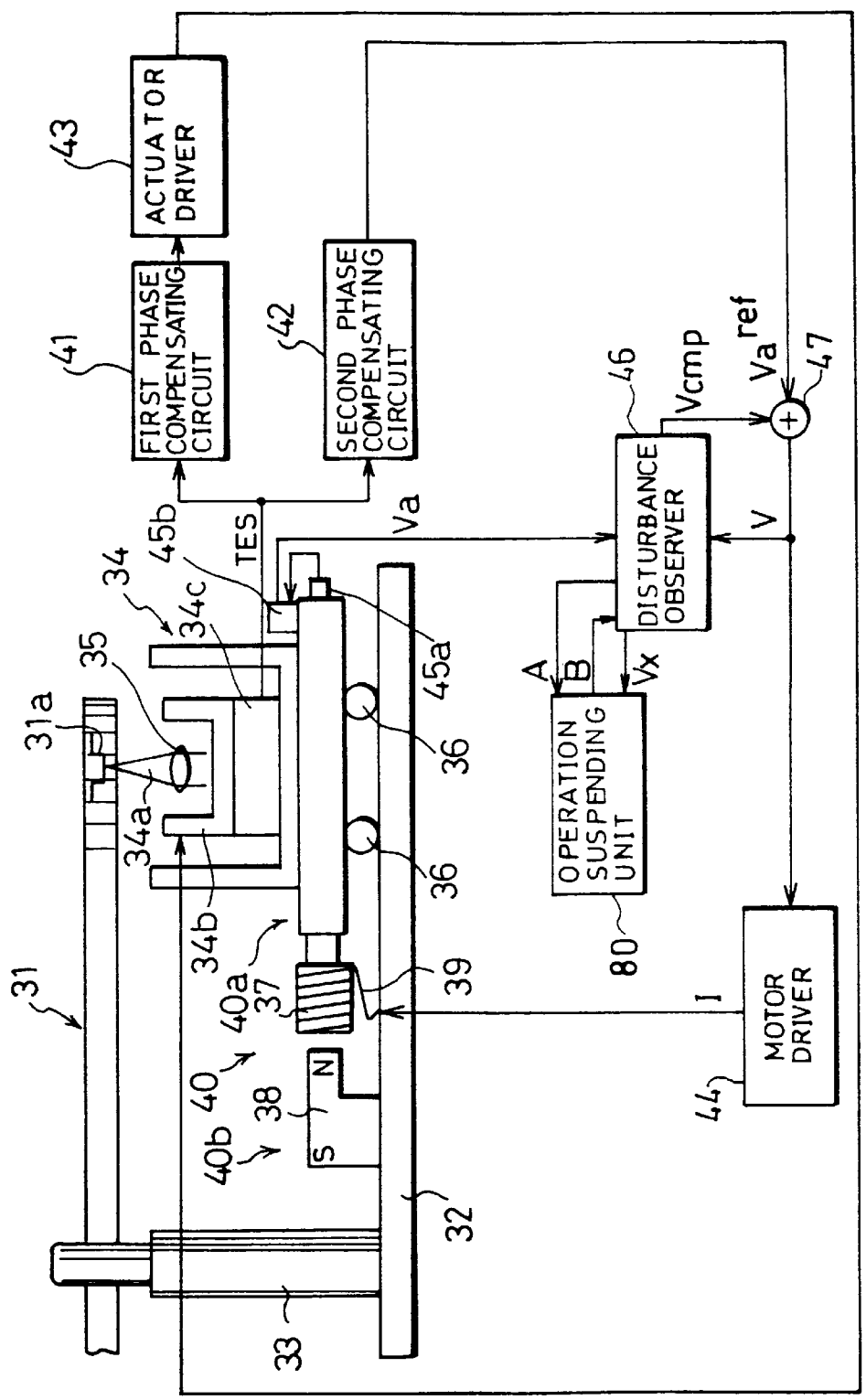
FIG. 16 is a view illustrating an arrangement of a motor control device, in accordance with the second embodiment of the present invention.

FIG. 16 illustrates an example of an optical disk apparatus which utilizes a motor control device, the motor control device being in accordance with the second embodiment of the present invention. An optical disk denoted as 31, which is an information recording medium, is rotated by a spindle motor 33 provided on a chassis 32. An optical pickup 34 projects a laser beam 34a on a track 31a of the optical disk 31, thereby recording and reproducing information. The laser beam 34a is converged by an objective lens system 35. In the optical pickup 34, there are provided a lens actuator system 34b, an optical and circuit system 34c. The lens actuator system 34b moves the objective lens system 35 in a radial direction of the optical disk 31. The optical and circuit system 34c detects how the laser beam 34a deviates from a target track 31a of the optical disk 31, and outputs it as a tracking error signal TES. The optical pickup 34 is also provided with bearings 36 and a driving coil 37.

A permanent magnet 38 is provided on the chassis 32. A driving force is generated by a magnetic field due to the permanent magnet 38 and a magnetic field due to the driving coil 37 to which a current is applied. The driving force moves the optical pickup 34 in the radial direction of the optical disk 31. Thus, the permanent magnet 38 constitutes a motor mechanism called a linear motor 40.

An FPC (flexible printed circuit board) 39 is provided so as to communicate electric power and signals between the optical pickup 34 and the driving coil 37 on one hand and control circuits on the other hand. However, for convenience sake, the function of the FPC is limited to transmit the current from the motor driver 44 to the driving coil 37 as shown in the figure.

The tracking error signal TES is amplified to a necessary level and given necessary frequency characteristics by a first phase compensating circuit 41. Thereafter the TES is sent to an actuator driver 43, where the TES functions as a drive current for driving the lens actuator system 34b. The TES is also amplified to a necessary level and given necessary frequency characteristics by a second phase compensating circuit 42, so as to become a reference drive voltage signal $V_a^{ref}$. An adder 47 adds the reference drive voltage signal $V_a^{ref}$ and a compensating voltage signal $V_{cmp}$ generated by a disturbance observer 46, so as to generate a drive voltage signal V. In response to the drive voltage signal V, the motor driver 44 supplies a drive current I to the linear motor 40 (more exactly, the driving coil 37). More detailed description will be made later on the linear motor 40.

The disturbance observer 46 is also connected with an operation suspending unit 80. The operation suspending unit 80 compares a signal in the disturbance observer 46 with a reference level, the signal being regarded as the judgement objective signal $V_x$ indicating a strength of shocks. Depending on the result of the comparison, the operation suspending unit 80 suspends/resumes the operation of the disturbance observer 46, as will be mentioned later in detail.

The section which is movably provided relatively to the chassis 32, such as the optical pickup 34, the bearings 36, and the driving coil 37, is hereinafter referred to as a "movable section 40a" of the linear motor 40, where necessary. On the other hand, the section which is immovably provided relatively to the chassis 32, such as the permanent magnet 38 and the spindle motor 33, is hereinafter referred to as a "stationary section 40b", where necessary.

The lens actuator system 34b and the linear motor 40, in response to the TES, co-operate in positioning the laser beam 34 so that it is converged on the track 31a. Thus, the lens actuator system 34b and the linear motor 40 constitute a two-stage tracking servo system. When the converged laser beam 34a deviates from the target track 31a, such deviation causes the TES to contain low frequency components with great amplitudes and high frequency components with small amplitudes. The two-stage tracking servo system usually executes the following control operations, so as to make the laser beam 34a follow the track 31a: (1) controlling the linear motor 40 so as to move the whole optical pickup 34 in response to the low frequency components with great amplitudes of the TES due to the deviation; and (2) controlling the lens actuator system 34b so as to move the objective lens system 35 in response to the high frequency components with small amplitudes of the TES due to the deviation.

When the linear motor 40 does not appropriately operate due to affections of its characteristic distortion, changes of parameters, disturbance, or the like, it is not impossible to control only the lens actuator system 34b so as to move the objective lens system 35, in order to make the laser beam 34a follow the track 31a. Note that in this case, the moving distance of the objective lens system 35 increases, compared with the case where the linear motor 40 operates normally.

A widely-used method for detecting the TES issued by the optical pickup 34 is the push-pull method. But, when the push-pull method is applied to the optical pickup 34 having such an objective lens system 35 moving a long distance, this method presents the following problem: even though the TES shows a value of 0, the objective lens system 35 is unable to converge the laser beam on the center of a track, as disclosed by Morio Ogami, et.al. (Hikari Disk Gijutsu (Optical Disk Technology), Radio Gijutsusha, 1989, pp. 87–88), resulting in that a precise positioning and tracking is impossible. To cope with the problem, the optical disk apparatus of the present embodiment employs the disturbance observer 46. This arrangement enables the linear motor 40 to appropriately operate, thereby restraining the moving distance of the objective lens system 35 by the lens actuator system 34b.

Figure 17:
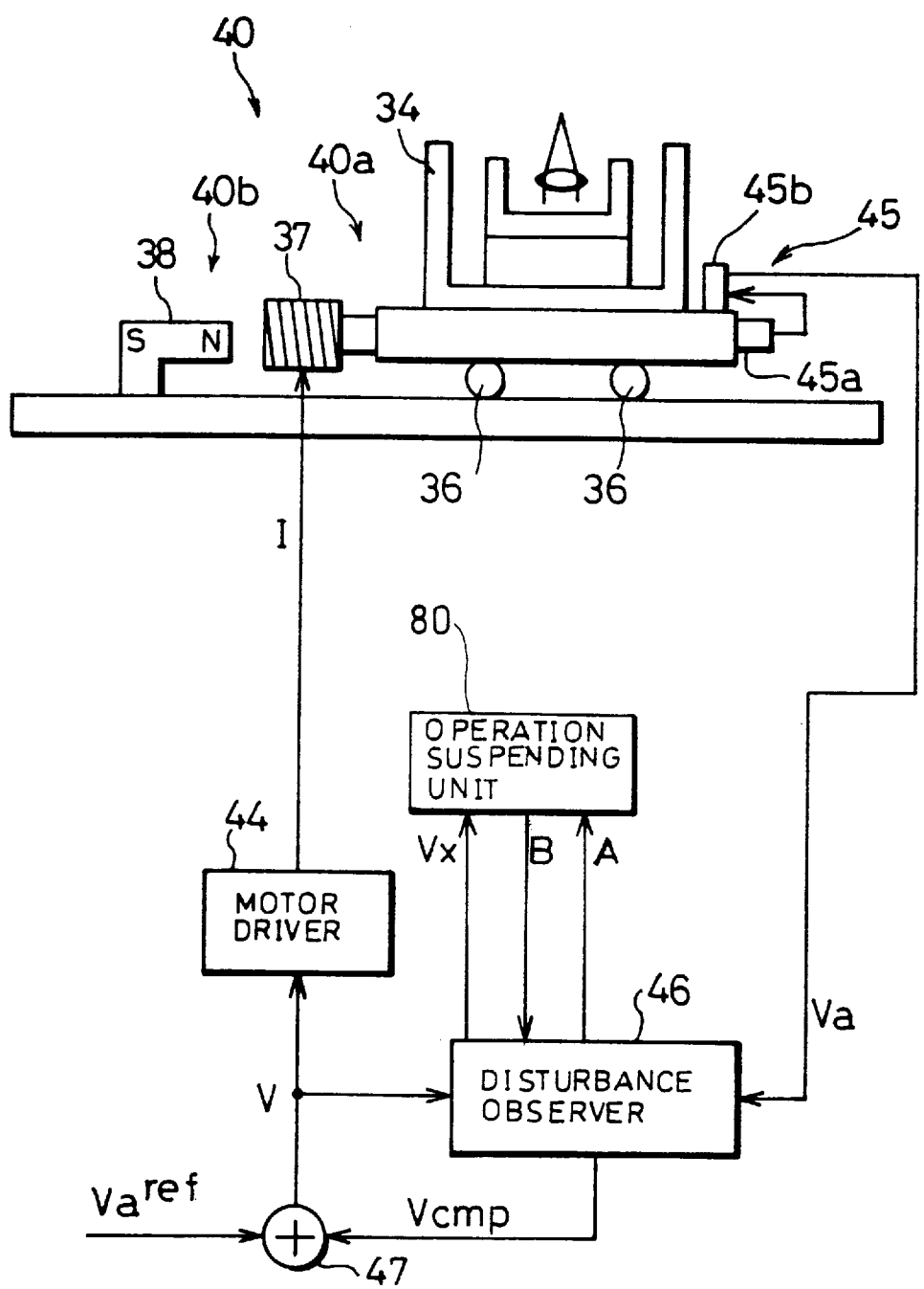
FIG. 17 is a view illustrating an arrangement surrounding the disturbance observer of the motor control device.

FIG. 17 illustrates the disturbance observer of the optical disk apparatus, and other parts in relation with the disturbance observer.

As shown in FIG. 17, the motor 40, which is an object of control, is a D.C. linear motor utilizing electromagnetic force, for use in the foregoing optical disk apparatus. The motor driver is denoted as 44, and the disturbance observer is denoted as 46.

The movable section 40a of the linear motor 40 is provided with an acceleration sensor 45a and a buffer amplifier 45b. The combination of the acceleration sensor 45a and the buffer amplifier 45b is referred to as an acceleration sensor unit 45 (acceleration detecting means).

The disturbance observer 46 is supplied with (1) an acceleration signal $V_a$ and (2) a drive voltage signal V. The acceleration signal $V_a$ is obtained by the buffer 45b buffering a signal detected by the acceleration sensor 45a. The drive voltage signal V is supplied by the motor driver 44, which corresponds to a drive current signal I for driving the linear motor 40.

The disturbance observer 46 outputs a compensating voltage signal $V_{cmp}$, which corresponds to a compensating current $I_{cmp}$ required for compensating an estimated disturbance. The compensating voltage signal $V_{cmp}$ is added by the adder 47 to the reference drive voltage signal $V_a^{ref}$ which is sent from outside for driving the linear motor 40. An output of the adder 47 is sent to the motor driver 44 as the drive voltage signal V.

The reference drive voltage signal $V_a^{ref}$ is a signal supplied from outside (for example, from the second phase compensating circuit 42 in FIG. 16) for driving and controlling the linear motor 40 during servo operation.

The operation suspending unit 80 mentioned above is not discussed here in the description referring to FIG. 17, since it will be discussed later.

Various types may be employed as the motor driver 44 in FIG. 17, provided that a current (unit:A) whose amplitude is equal to an inputted voltage (unit:V) is supplied to the linear motor 40, namely, it has a transfer gain of 1 and a conversion gain $K_D$ of 1 [A/V] which enables to convert the dimension of an inputted signal from voltage to current.

Thus, the motor driver 44 has a transfer gain of 1 and converts the dimension of the inputted signal from voltage to current. It is well done and convenient, when the disturbance observer is realized by actual electronic circuits, that signals of current dimension are converted to signals of voltage dimension during operations. Therefore, as is the case of the first embodiment, unless otherwise noted, a signal which should be represented as a signal of current dimension is hereinafter represented as a signal of voltage dimension for convenience sake.

Figure 18:
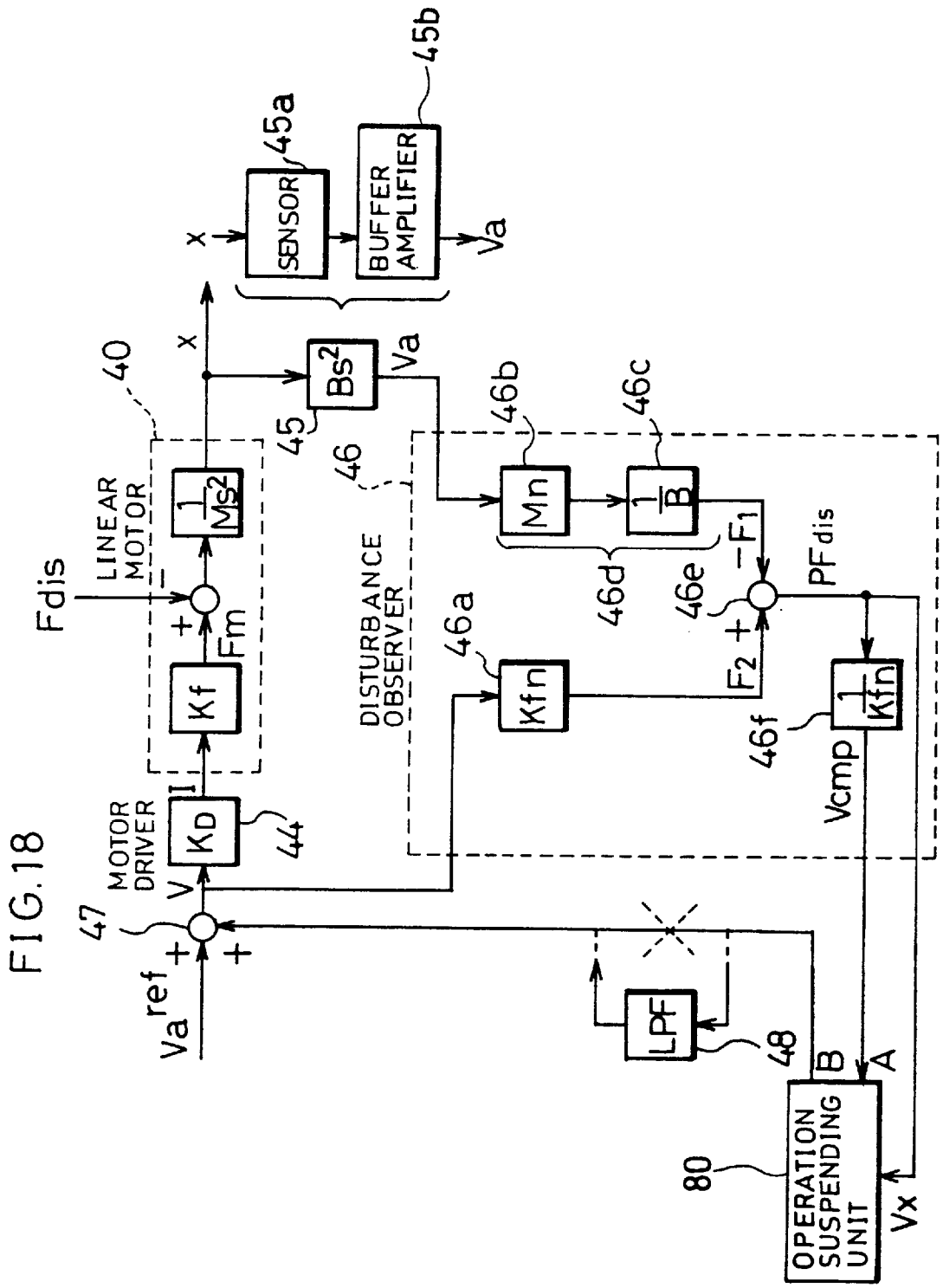
FIG. 18 is a block diagram of the motor control device.

FIG. 17 is re-drawn into FIG. 18, taking the above discussion into consideration. Variables and the like shown in FIG. 18 are:

$K_f$: thrust constant of linear motor,

M: mass of movable section of linear motor, $K_{fn}$: nominal value of $K_f$ (reference value), $M_n$: nominal value of M, B: sensitivity of acceleration sensor, $F_m$: thrust of linear motor, $F_{dis}$: disturbance force (including parameter variation and the like), $PF_{dis}$: estimated disturbance force (including parameter variation and the like), $F_1$: thrust estimated from acceleration through inverse operation, $F_2$: thrust calculated from drive current, $V_a^{ref}$: drive voltage reference value for linear motor, V actual drive voltage value for linear motor, $V_{cmp}$: voltage signal for compensating disturbance, x: displacement of linear motor, and s: Laplace operator.

The following description will explain each block in FIG. 18. Reference numeral 40 indicates the linear motor in a transfer function, and indicates a two-stage integral system having the thrust constant $K_f$ and the mass M of the movable section.

A block 44 represents the motor driver, which is arranged in the same manner as the driver 12 shown in FIG. 8 of the first embodiment.

A block 46a is realized by an electronic circuit, which is represented by an amplifier which has an ideal transfer function between the drive current I and the thrust $F_m$, that is, has a gain corresponding to the nominal value $K_{fn}$ of the thrust constant of linear motor 40. The block 46a may be realized, for example, by inverting amplifier circuits incorporating OP amplifiers, as shown in FIG. 4 of the first embodiment.

A block 45 represents the acceleration sensor unit, realized by the acceleration sensor 45a employing a piezoelectric element and the buffer amplifier 45b. The acceleration sensor unit 45 has a sensitivity B in total.

The sensitivity B is multiplied by $s^2$ which indicates the two-stage differential operation since the acceleration is detected in accordance with displacement x of the linear motor 40. However, the acceleration sensor 45a does not actually carry out the differential operation. $s^2$ is multiplied based on the fact that the acceleration which is equal to the two-stage differential operation of the displacement x of the linear motor 40 is detected.

Figure 19:
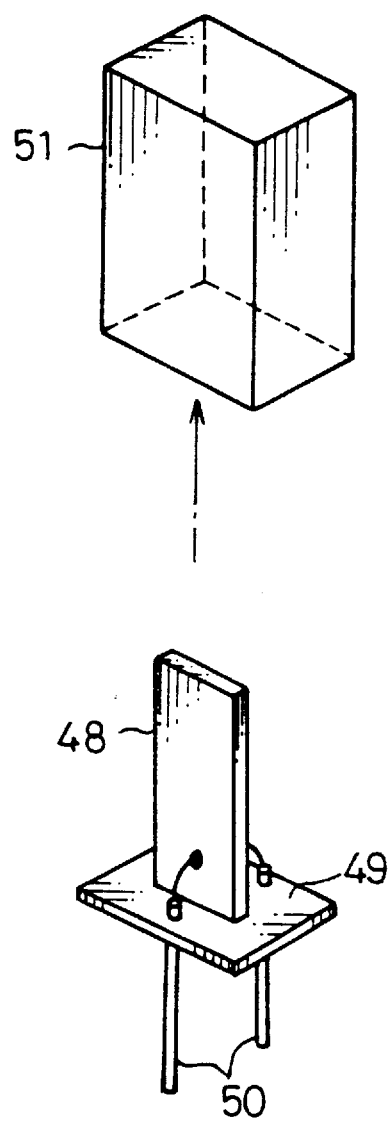
FIG. 19 is a perspective view illustrating an example of an arrangement of an acceleration sensor.

The acceleration sensor 45a has a simple structure, composed of a piezoelectric element 48 with a length of several millimeters, a supporter 49, and electrodes 50, as shown in FIG. 19. The piezoelectric element 48 is supported by the supporter 49 at one end. The electrodes 50 of the piezoelectric element 48 pierce the supporter 49 and appear on the opposite side of the supporter 49. The piezoelectric element 48 and the supporter 49 are inserted into a package 51, thereby becoming small in size, light, and relatively solid. Therefore, such an acceleration sensor 45a can be selectively disposed around the linear motor 40, thereby broadening the margin during designing. Furthermore, it is also avoidable that space around the linear motor 40 is expanded due to the attachment of the acceleration sensor 45.

Figure 20:
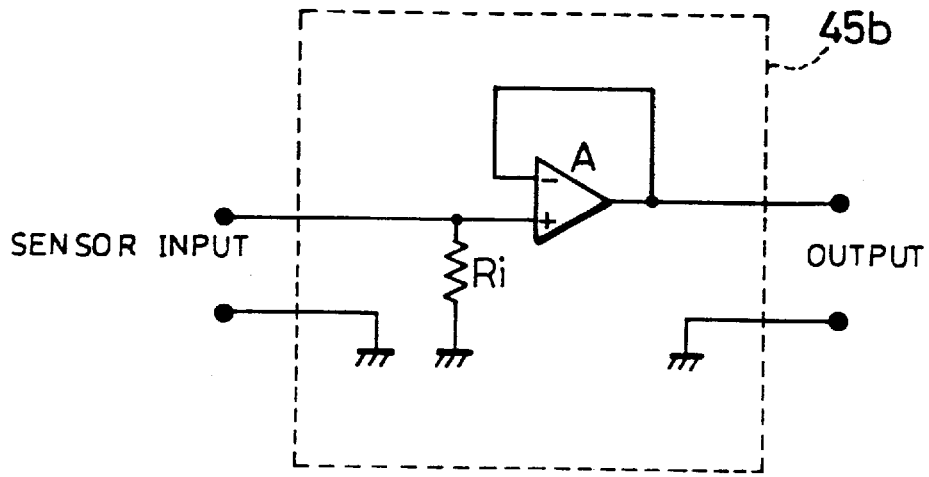
FIG. 20 is a circuit diagram illustrating an example of an electronic circuit arrangement of a buffer amplifier for the acceleration sensor.

A block 45b represents the buffer amplifier, provided near the acceleration sensor 45a. The buffer amplifier 45b is realized, for example, by a voltage follower employing an OP amplifier A, and an input resistor Ri which bias current goes through, as shown in FIG. 20.

Another example of the acceleration sensor unit 45 may be realized by IC chip integrating peripheral circuits, such as acceleration sensors and buffer amplifiers, utilizing the micromachining technology disclosed in "Air Bags Boom When IC Accelerometer Sees 50G" (Frank Goodenough, Electronic Design, Aug. 8, 1991, pp. 45–56).

Figure 21:
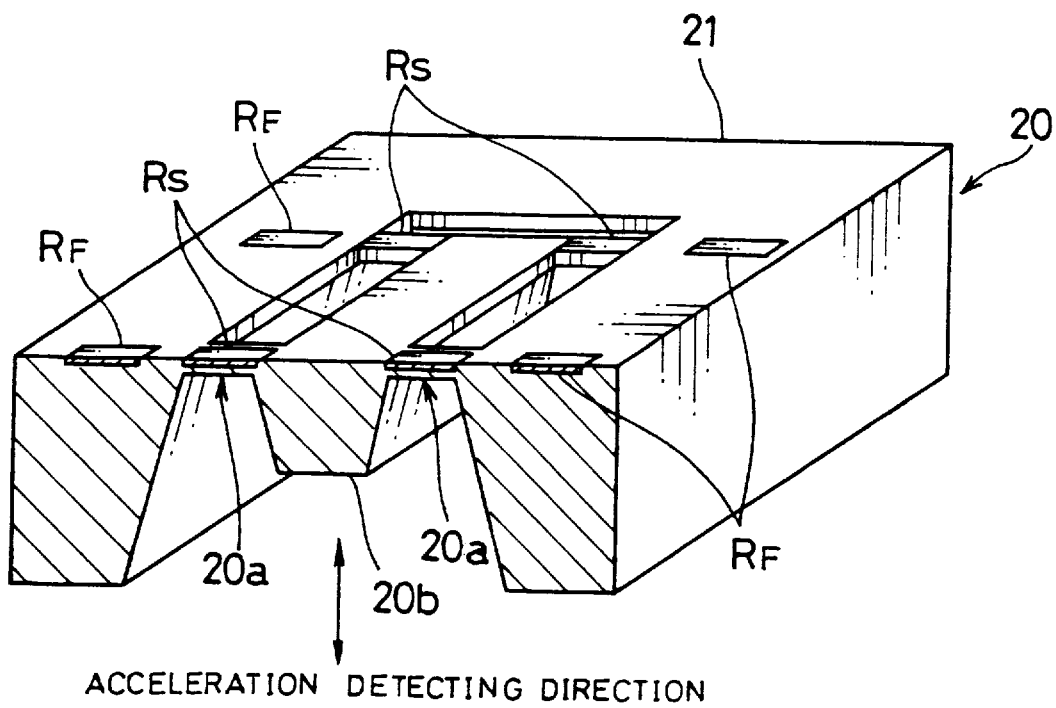
FIG. 21 is a cross-sectional perspective view illustrating an example of a piezoelectric resistive element for use in the acceleration sensor.
Figure 22:
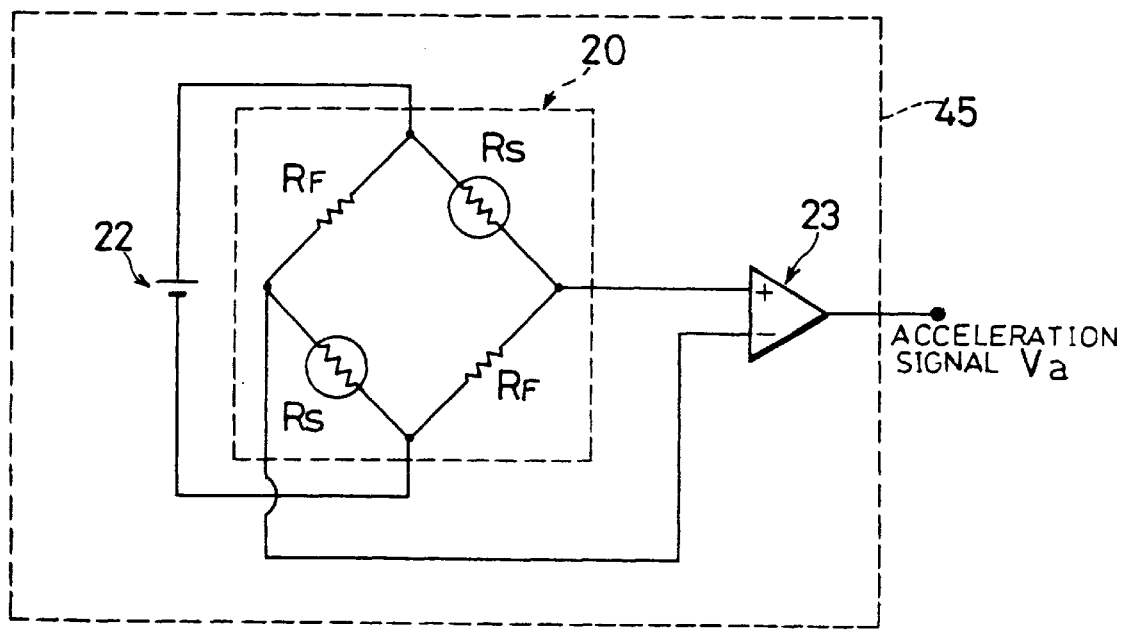
FIG. 22 is a circuit diagram illustrating an arrangement of an acceleration sensor unit utilizing the piezoelectric resistive element.

FIG. 21 illustrates an arrangement of a piezoelectric resistive element 20, as an example of such acceleration sensor unit 45. By etching a silicon substrate 21, thin beams 20a and a weight part 20b supported by the beams 20a are formed on the substrate 21. Each beam 20a is provided with a pressure sensitive resistor $R_S$, while resistors $R_F$ are formed on the other part of the substrate 21 for forming a resistors bridge (later described), the resistors $R_S$ and $R_F$ being provided respectively by the diffusion process. The acceleration sensor unit 45 employing this piezoelectric resistive element 20 forms the resistor bridge shown in FIG. 22, using the pressure sensitive resistors $R_S$, and the resistors $R_F$. The piezoelectric resistive element 20 is connected with a reference voltage source 22 and a differential amplifier 23. The acceleration sensor unit 45 of FIG. 22 detects an acceleration applied to the piezoelectric resistive element 20 in the direction indicated by an arrow in FIG. 21, by detecting a bending of the beams 20a which maintains the inertia generated in the weight 20b, namely, by detecting changes of the resistance values of the respective pressure sensitive resistors $R_S$. Amount of the inequilibrium in the resistor bridge thus detected is outputted as an acceleration signal $V_a$ by the differential amplifier 23.

Another example of the acceleration sensor unit 45 having an integrated arrangement is shown in FIG. 23(a). The core part for detecting an acceleration is an acceleration sensor section 24, which is formed by growing silicon polycrystal on a silicon monocrystal substrate 24a and etching it.

The acceleration sensor section 24 has a movable electrode X which is composed of a wide weight part $X_1$, supporting parts $X_2$ with elasticity, and electrode parts $X_3$ functioning as electrodes. The wide weight part $X_1$, the supporting parts $X_2$, and the electrode parts $X_3$ are integrally provided. The weight part $X_1$, provided around the center of the substrate 24a, is supported by the supporting parts $X_2$ which are provided at the ends of the weight part $X_1$. Each of the supporting parts $X_2$ extends long and narrow and raises the weight part $X_1$ slightly up from the substrate 24a. The weight part $X_1$ moves in the direction indicated by an arrow in FIG. 23(a) (acceleration detecting direction), due to the bending of the supporting parts $X_2$. The electrode parts $X_3$ are provided on the both edges of the weight part $X_1$ at a regular interval, extending in the width direction of the weight part $X_1$.

Fixed electrodes Y and Z are provided between respective neighboring electrode parts $X_3$. Each one end of the fixed electrodes Y and Z is fixed to the substrate 24a so that other each end is slightly raised upwards. The supporting parts $X_2$ and the fixed electrodes Y and Z are fixed on the substrate 24a by the fixing parts 24b, as shown in FIG. 23(b). In the acceleration sensor section 24, the electrode part $X_3$, the fixed electrode Y, and the fixed electrode Z provide a variable capacitor, as shown in FIG. 23(c).

With the described arrangement of the acceleration sensor section 24, when an acceleration in the direction indicated by the arrow is applied to the weight part $X_1$, the movable electrode X shifts relatively to the fixed electrodes Y and Z on the substrate 24a due to the inertia. Therefore, the acceleration thus applied appears as a relative and differential change in the capacitance between the movable electrode $X_3$ and the fixed electrodes Y and Z, depending on the magnitude and direction of the applied acceleration. Furthermore, a square-wave oscillator 28 shown in FIG. 23(a) supplies square-wave signals $V_A$ and $V_C$ to the fixed electrodes Y and Z of the acceleration sensor section 24, respectively. The square signals $V_A$ and $V_C$ have a frequency (for example, about 1 MHz) enough higher than target frequencies of the acceleration to be detected, while they have phases opposite to each other (see FIG. 23 (c)). As a result, a signal $V_B$ is induced to the electrode part $X_3$ (the movable electrode $X_3$) due to its electrostatic capacitance which is formed between the fixed electrodes and the electrode part $X_3$. The phase (same as either the phase of the signal $V_A$ or that of the signal $V_C$) and amplitude of the signal $V_B$ vary depending on a change in the differential electrostatic capacitance between the electrode part $X_3$ and the fixed electrodes Y and Z. The applied acceleration can be outputted as an electric signal in the following manner. The signal $V_B$ is buffered by a buffer amplifier 25, and is sent to a demodulator/low-pass filter 26. The demodulator/low-pass filter 26 demodulates the buffered signal $V_B$ in synchronization with a synchronization signal Sync supplied from the square-wave oscillator 28 (synchronous detection), and then extracts low frequency components of the signal $V_B$ thus demodulated. The low frequency components are amplified by an amplifier 27. The amplifier 27 outputs the foregoing electric signal in accordance with the applied acceleration.

Figure 23:
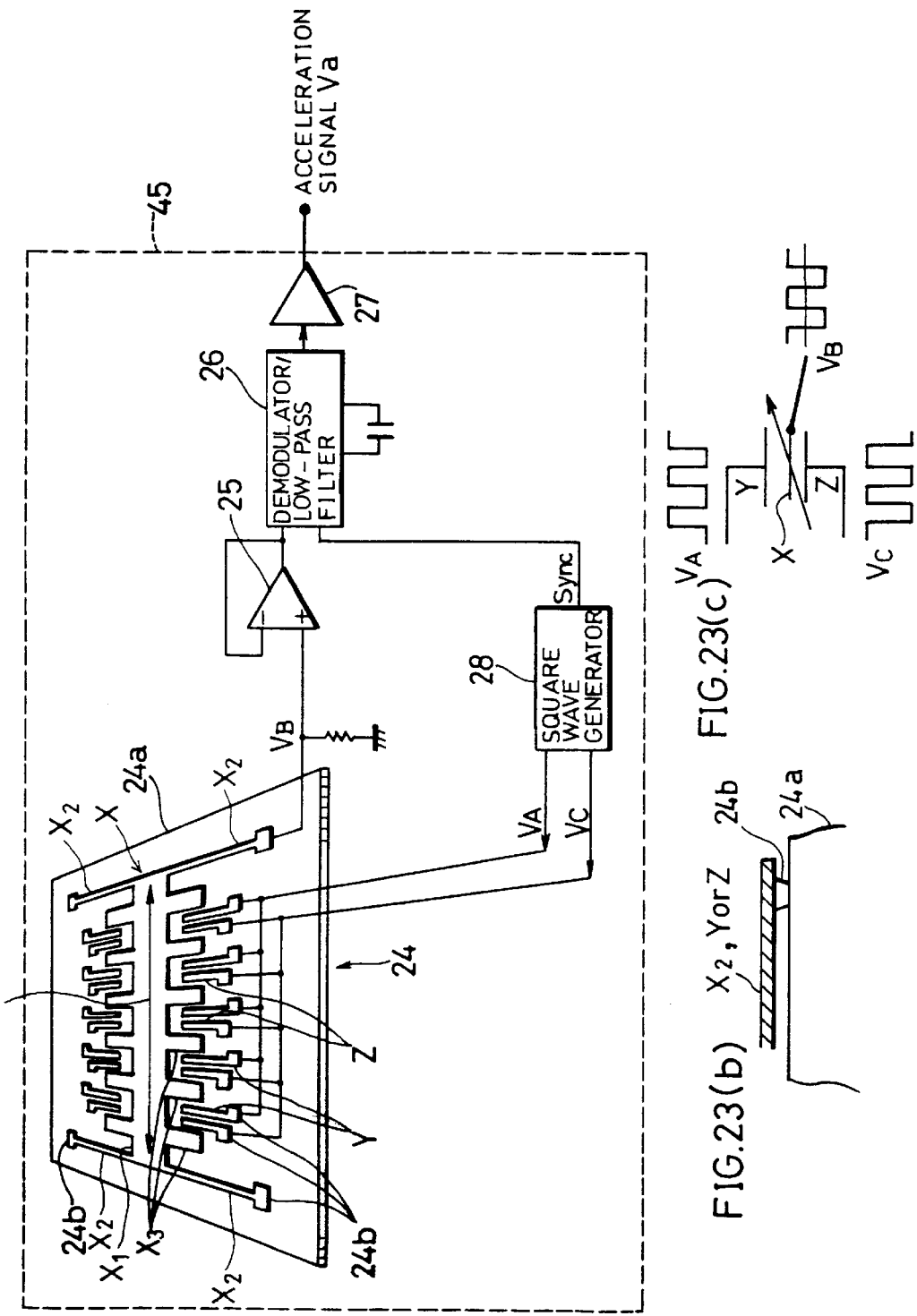
FIG. 23(a) is a view illustrating another arrangement of the acceleration sensor unit.
FIG. 23(b) is a view illustrating how movable and fixed electrodes are provided in the acceleration sensor section shown in FIG. 23(a).
FIG. 23(c) is a circuit diagram illustrating an equivalent schematic of the acceleration sensor section shown in FIG. 23(a).
Figure 24:
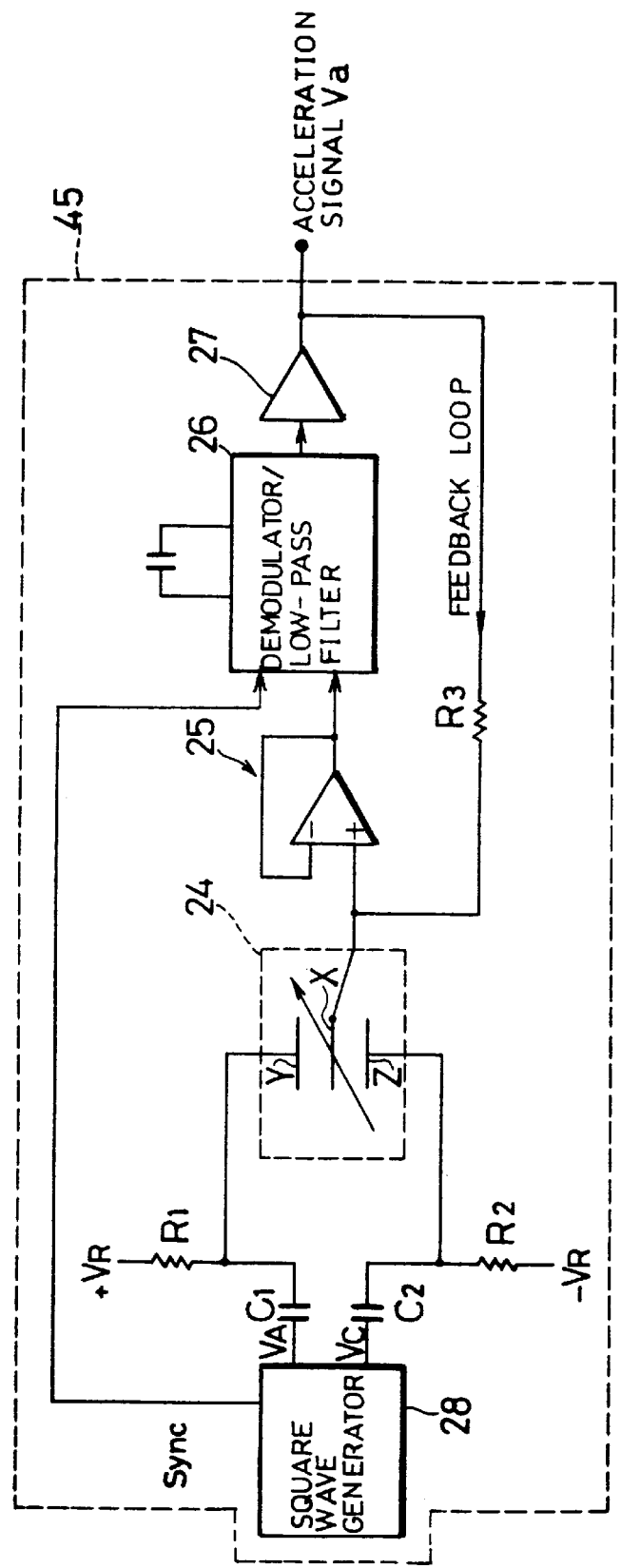
FIG. 24 is a view illustrating still another arrangement of the acceleration sensor unit.

Still another arrangement example of the acceleration sensor unit 45 is shown in FIG. 24. The acceleration sensor unit 45 shown in FIG. 24 incorporates the same acceleration sensor section 24, but has a different arrangement as a whole. The acceleration sensor section 24 in FIG. 24 is redrawn into an equivalent schematic shown in FIG. 23(c).

The arrangement of the acceleration sensor unit 45 shown in FIG. 24 is almost the same as that shown in FIG. 23, except the following two points. First, square-wave signals $V_A$ and $V_C$ which have opposite phases to each other are sent from the square-wave oscillator 28 to the fixed electrodes Y and Z of the acceleration sensor section 24 through capacitors $C_1$ and $C_2$, respectively, while D.C. bias voltages from reference voltage sources $+V_R$ and $-V_R$, respectively, are supplied to the fixed electrodes Y and Z through resistors $R_1$ and $R_2$, respectively. Secondly, the acceleration signal $V_a$, outputted from the amplifier 27, is fed back to the movable electrode X of the acceleration sensor section 24 through resistors $R_3$.

According to the arrangement of the acceleration sensor unit 45 shown in FIG. 24, the acceleration signal $V_a$, obtained by detecting a shift of the movable electrode X caused by an acceleration as change in the capacitance, is fed back to the movable electrode X. Therefore, an electrostatic force is exerted between the movable electrode X and the fixed electrodes Y and Z, by the acceleration signal $V_a$ and the reference voltages $+V_R$ and $-V_R$. The electrostatic force is exerted in the reverse direction of the force due to the inertia caused by the acceleration applied to the movable electrode X. This reduces the shift of the movable electrode X nearly to nil. As a result, the acceleration signal $V_a$ of the acceleration sensor unit 45 arranged as shown in FIG. 24, unlike that of the acceleration sensor unit 45 in accordance with the arrangement shown in FIG. 23(a), works as a necessary voltage to generate the electrostatic force retaining the movable electrode X at its original position, opposing the force due to the inertia caused by the applied acceleration.

The following description, leaving the acceleration sensor unit 45, will again discuss respective elements (blocks) of the motor control device, referring to the block diagram of FIG. 18. A block 46b represents an amplifier having a gain which corresponds to a reciprocal of ideal characteristics between the thrust of linear motor $F_m$ and the acceleration $S^2 \cdot X$, that is, the reciprocal of $1/M_n$, or a gain of $M_n$. A block 46c represents an amplifier having a gain of 1/B, that is, a reciprocal of the sensitivity of the acceleration sensor unit 45. The amplifiers 46b and 46c constitute a block 46d which, when the linear motor 40 have the nominal values of the parameters, estimates a force applied to the linear motor 40 including the disturbance $F_{dis}$ on the basis of an acceleration signal detected by the acceleration sensor unit 45.

Like the block 13b and other blocks of the first embodiment (see FIG. 4), the block 46d can be realized by two inverting amplifier circuits connected in series, which incorporate OP amplifiers and are designed to have gains of $M_n$ and 1/B, respectively.

A block 46e represents a subtracter for comparing an output $F_1$ of the block (amplifier) 46a and an output $F_2$ of the block 46d (amplifier) and detecting a difference between them, thereby estimating a disturbance $PF_{dis}$ which includes parameter variations of the linear motor 40. Like, for example, the subtracter 13g of the first embodiment (see FIG. 5), the subtracter 46e can be realized by a differential amplifier circuit incorporating an OP amplifier.

Figure 25:
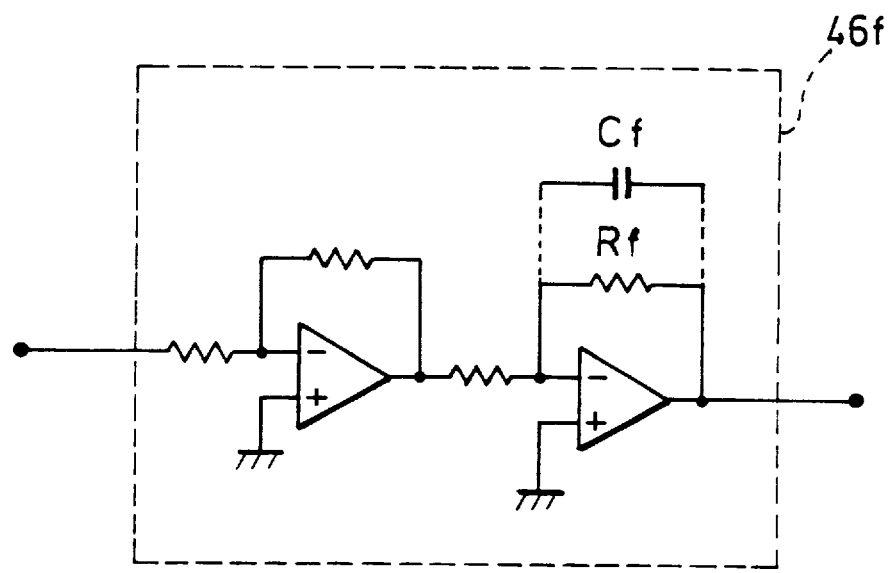
FIG. 25 is a circuit diagram illustrating an electronic circuit arrangement of a block (amplifier) in the disturbance observer.

A block 46f represents an amplifier having a characteristic reverse to that of the block 46a, that is, having a gain of $1/K_{fn}$, or the reciprocal of the nominal value $K_{fn}$ of the thrust constant $K_f$ of the linear motor 40, and obtains an electric current $I_{cmp}$ required for canceling and compensating the estimated disturbance $PF_{dis}$. The block 46f can be realized, for example, by two inverting amplifier circuits, which are connected in series and incorporate OP amplifiers respectively, as shown in FIG. 25. A capacitor $C_f$ is connected, as is indicated by broken lines shown in FIG. 25, in parallel with a feedback resistor $R_F$ of the second inverting amplifier circuit. The capacitor $C_f$ is thus connected, only when characteristics of a low-pass filter (LPF) 48 (described later) is to be included in that of the block 46f.

A block 47 represents an adder which adds the compensating voltage signal $V_{cmp}$, which is required for compensating the disturbance including parameter variations, to the reference drive voltage signal $V_a^{ref}$ supplied from outside. The adder 47 sends the drive voltage signal V, which is obtained as a result of addition, to the linear motor 40 and the block 46a in the disturbance observer 46. The adder 47 can be realized by an inverting amplifier circuit and an inverting adder circuit incorporating an OP amplifier, which are connected each other, like the adders 11 and 13c of the first embodiment as shown in FIG. 6.

Figure 7:
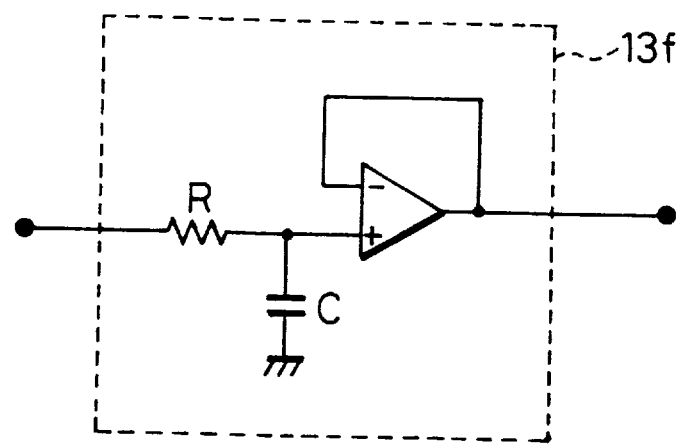
FIG. 7 is a circuit diagram illustrating an example of an electronic circuit arrangement of a low-pass filter of the disturbance observer.

A block 48 represents the LPF (low pass filter), for controlling a bandwidth of high frequencies of the disturbance observer 46, is provided in accordance with the need. The LPF 48 can be realized by, for example, a voltage follower incorporating an OP amplifier and a first order RC low-pass filter incorporating a resistor and a capacitor, the RC low-pass filter being connected to the input terminal of the voltage follower, like the low-pass filter 13ƒ of the first embodiment shown in FIG. 7. However, as shown in FIG. 25 illustrating the arrangement of the block 46ƒ (mentioned above), a capacitor $C_f$ may be connected, in parallel, to a feedback resistor $R_F$ of the inverting amplifier circuit (the second circuit) so that the characteristics of the LPF are included in the block 46ƒ. In this case of the second embodiment, the circuit as shown in FIG. 7 is unnecessary.

Such an LPF for limiting a bandwidth is required, for example, when affection of noise induced in circuits and sensors is to be reduced, or when high-frequency mechanical resonance occurring to the linear motor may cause the disturbance observer to operate unstably.

A block 80 represents the operation suspending unit 80, which has the same configuration as that of the operation suspending unit of the first embodiment (see FIG. 9). FIG. 18 shows the block diagram of the motor control device of the second embodiment. More specifically, according to FIG. 18, (1) the output of the subtracter 46e (the estimated disturbance $PF_{dis}$) is adopted as the judgement objective signal $V_x$, and (2) the suspension is carried out by the operation suspending unit 80 between an output (the compensating voltage signal $V_{cmp}$) of the block (amplifier) 46ƒ and the adder 47. However, another signal and another point may be applied as the judgement objective signal and the point where the operation is suspended, respectively.

Figure 26:
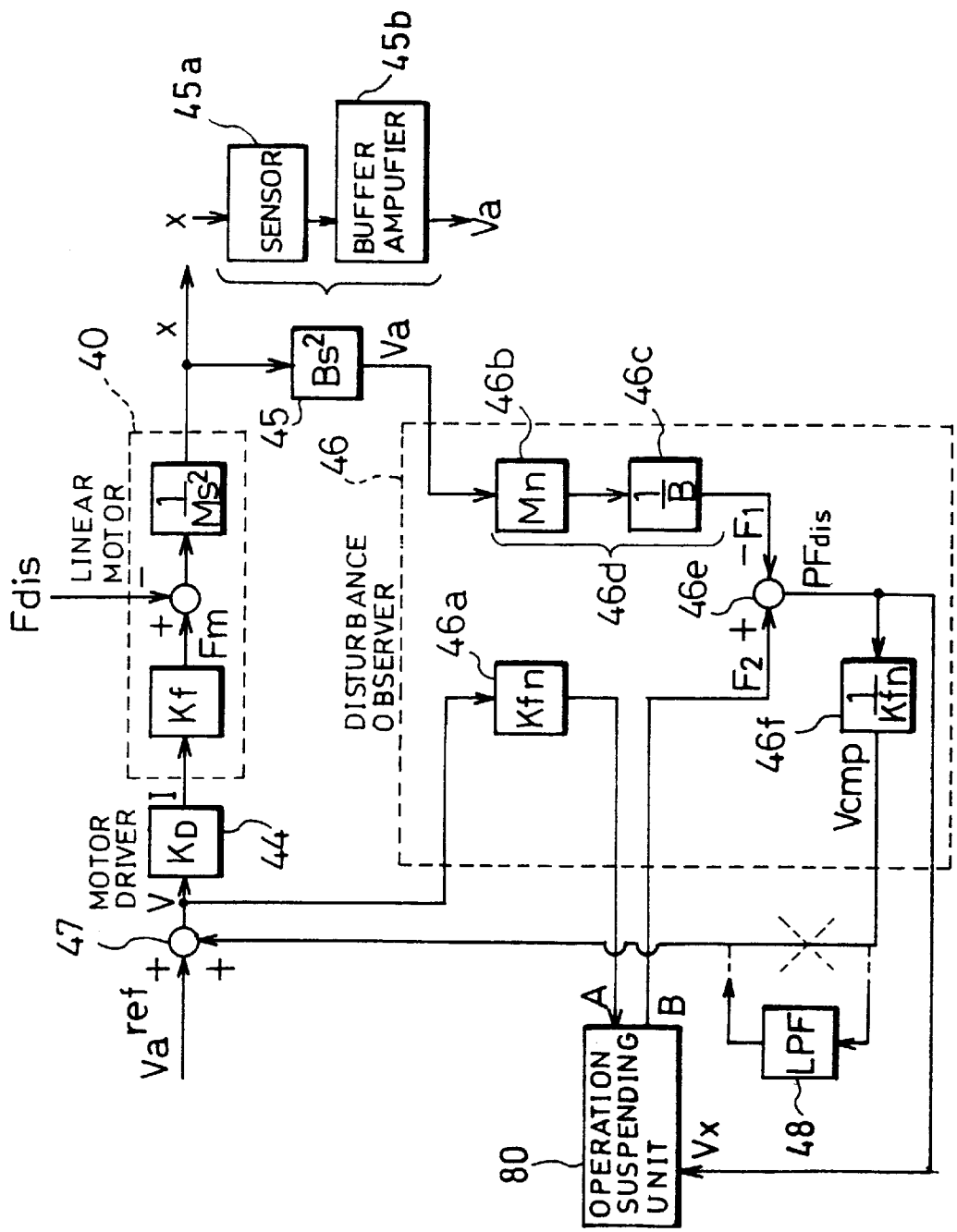
FIG. 26 is a block diagram illustrating a variation of the motor control device.

With the arrangement, the operation suspending unit 80 virtually suspends the supply of an output of the disturbance observer 46. As shown in FIG. 26, the suspension of the operation may be carried out on the positive feedback loop in the disturbance observer 46, for example, between the block 46a having a gain of $K_{fn}$ and the subtracter 46e.

In the first embodiment, since the sensor for detecting the motor's motion was the velocity sensor, no signal indicates a disturbance such as shocks except the output signal of the subtracter 13g, which includes a differential signal (approximate differential signal). In contrast, in the second embodiment, since the acceleration sensor is employed, any signal issued between the acceleration signal $V_a$ and the compensating voltage signal $V_{cmp}$, contains affection of the disturbance such as the shocks. Therefore, any signal in the described range may be used as the judgement objective signal $V_x$.

Figure 27:
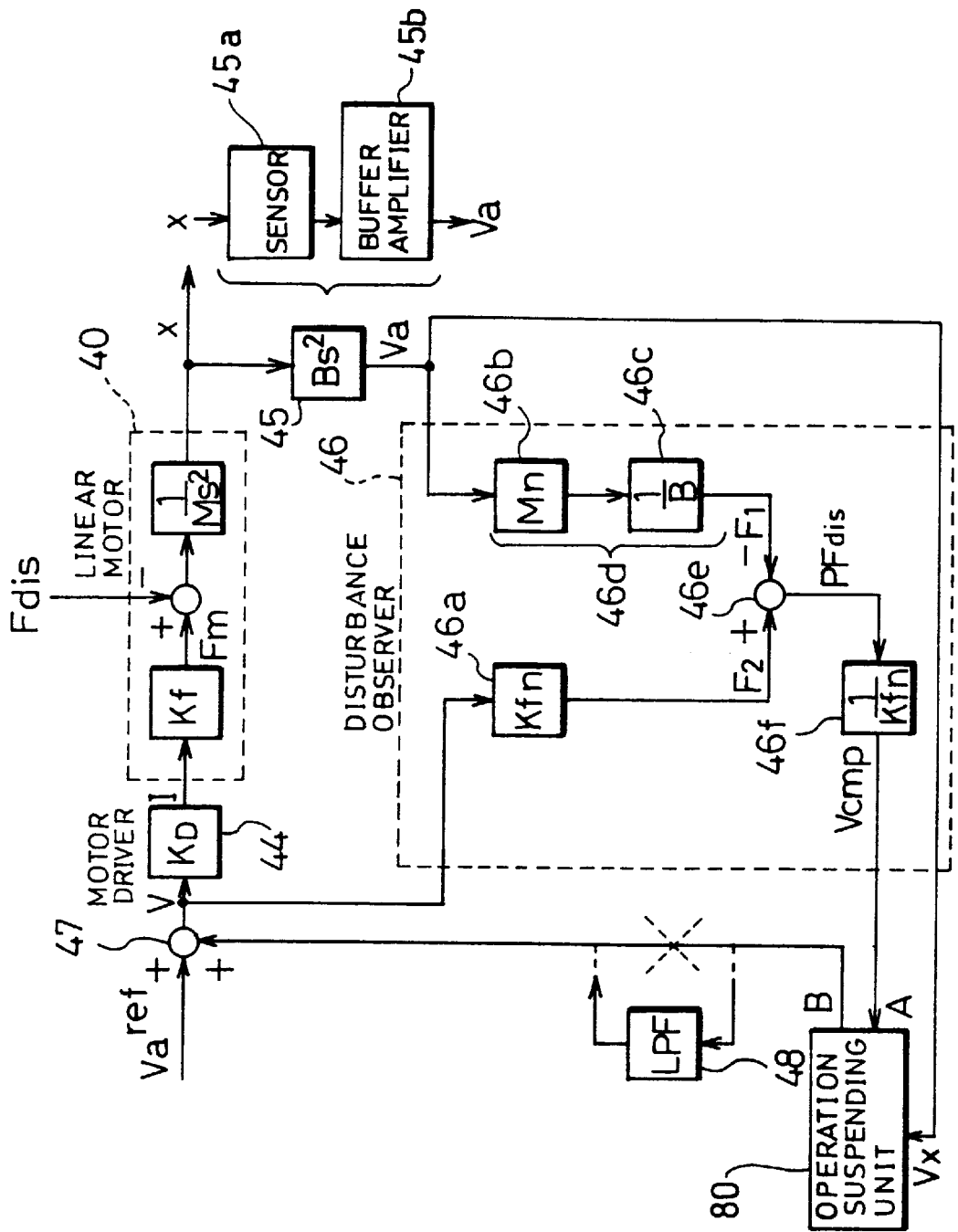
FIG. 27 is a block diagram illustrating another variation of the motor control device.

When a signal to which the equivalent differential operation is carried out in the disturbance observer 46, or a signal obtained by combining other signals other signal (for example, $PF_{dis}$) is used as the judgement objective signal $V_x$, it is possible to suspend the operation of the disturbance observer or the driving of the motor not only when a great acceleration is applied due to shocks or the like but also when an excessive input for driving is given from outside. On the other hand, when, for example, the acceleration voltage signal $V_a$ outputted by the acceleration sensor 45a or a signal obtained by amplifying the acceleration signal is used as the judgment objective signal $V_x$ (see FIG. 27), it is possible to obtain a signal exactly proportional to an acceleration caused by shocks or the like. Therefore, it is easy to set reference levels of comparators, such as $+V_\alpha$ and $-V_\alpha$ of the reference voltage sources 80e and 80ƒ shown in FIG. 9, respectively.

The operation suspending unit 80 is arranged so that the reference voltage sources 80e and 80ƒ have the voltages $+V_\alpha$ and $-V_\alpha$, respectively. The voltages $+V_\alpha$ and $-V_\alpha$ are substantially equal to or greater (for example, 1.5 times or several times) than the maximum thrust or a signal level corresponding to the maximum acceleration of the linear motor 40 in the normal operation. Such an arrangement does not affect the normal motion of the motor, and ensures that the suspension of operation is carried out only when excessive shocks due to collisions or the like occur.

As mentioned before, the acceleration sensor is employed in the second embodiment, instead of the velocity (angular velocity) sensor. The following description will discuss the advantage of the acceleration sensor.

As has already been described referring to FIG. 1 of the first embodiment, the amplifiers 13d and 13e, each of which has a gain of $(g \cdot J_n/C)$, conduct the approximate differential operation of the signal $V_C$ outputted from the velocity sensor 8, in collaboration with the adder 13c, the low-pass filter 13ƒ, and the subtracter 13g. In the bandwidth (whose upper limit angular frequency is g) in which the approximate-differential operation is carried out, the disturbance observer can restrain the affection of disturbances, such as frictions, parameter variations, and vibrations, thereby improving characteristics of the motor. Therefore, it is preferable that the bandwidth is in higher frequencies. For this reason, the amplifiers 13d and 13e are required to have a greater amplification degree, in order to make the bandwidth higher. However, the frequency bandwidth for the servo control with respect to the linear motor of the optical disk apparatus, which the present embodiment is concerned with, ranges from several hundreds of hertz to several kilos of hertz, generally one order higher than that for the magnetic disk apparatus of the first embodiment. Accordingly, greater amplification degrees are required for the amplifiers.

For example, in order that the linear motor of the optical disk apparatus obtains preferable characteristics up to about 2 kHz, the upper limit angular frequency g of the bandwidth is obtained as:

$$g = 2\pi \times 2000 \approx 12600$$

But, it is not easy to provide an amplifier with such a high gain. Even if an OP amplifier is utilized, the Op amplifier is required to have a bandwidth of not less than 25 MHz, or several OP amplifiers are required to be cascaded, so that such a high gain of 12,600 at 2 kHz is obtained. Even if such described arrangements are possible, however, they may cause amplification of noise of the amplifier(s), or noise applied to the amplifier(s).

The following description will continue the above discussion on the velocity sensor, taking into consideration the nominal value $M_n$ of the mass of the movable section of the linear motor instead of the nominal value $J_n$ of the moment of inertia of the rotary motor. If $M_n/C$ is extremely small, the gain $(g \cdot M_n/C)$ of the amplifier is also small. However, considering that the nominal value $M_n$ of the mass of the movable section of the linear motor for use in the optical disk apparatus is at least about 0.01 kg and that a linear-type velocity sensor applicable to the linear motor has a sensitivity C of aboutn 0.01 V/m·s$^{-1}$ at most, $g \cdot M_n/C$ cannot be smaller than g. Therefore, it is impossible to get the amplifier to have a smaller gain.

When estimating the disturbance in accordance with the detected velocity (angular velocity) information, the approximate-differential operation $\{s/(s+g)\}$ is performed up to the angular frequency g. However, such a differential operation intensifies noise caused by sensors, circuits, or noise given from outside. Therefore, when the motor is controlled based on information thus obtained, the driver and the motor may wastefully consume supplied power or may be heated up. Furthermore, such control causes unnecessary vibration or noise to the motor. Thus, expansion of the bandwidth results in an increase in the affection of noise.

On the other hand, the motor control device of the second embodiment employs the acceleration sensor, instead of the velocity sensor. Since the acceleration sensor is smaller and more solid, there present more options in selecting the position to which it is fixed. In addition, unlike the case of the velocity sensor, the approximate-differential operation is not necessary. Therefore, when broadening the control bandwidth, the disturbance observer is not required to include amplifiers having an extremely high gain, and is hardly affected by noise. As a result, the control bandwidth is easily expanded.

[Third Embodiment]

The following description will discuss the third embodiment of the present invention. In the first and second embodiments, the operation suspending units virtually suspend the operation of the disturbance observers, by suspending the transfer of the disturbance observers' output or by cutting of the signal transfer along the loop inside the disturbance observers. In contrast, an operation suspending unit of the third embodiment virtually suspends the driving of the motor by controlling the driver.

Figure 28:
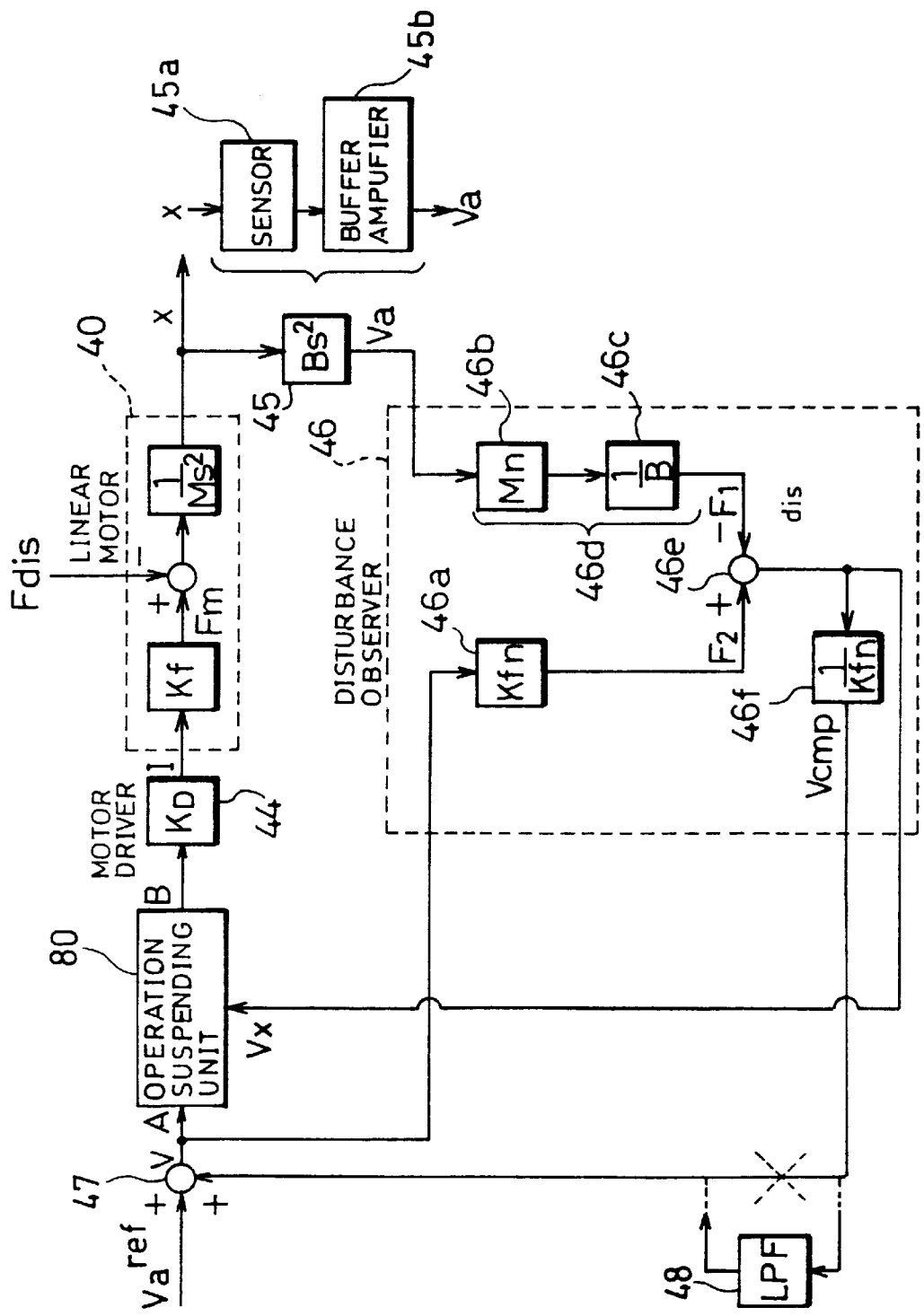
FIG. 28 is a block diagram illustrating an example arrangement of a motor control device, in accordance with the third embodiment of the present invention.

FIG. 28 is a block diagram illustrating a motor control device in accordance with the third embodiment of the present invention. Like the second embodiment, a disturbance observer employing an acceleration sensor is adopted in the third embodiment so as to control a linear motor in an optical disk apparatus. But, the operation suspending unit 80 does not suspend the supply of a signal in the disturbance observer 46, but suspends the supply of a signal applied to a motor driver 44.

The operation suspending unit 80 has the same configuration as that shown in FIG. 9 which is referred to in the first embodiment. But, one having another arrangement, for example, any of the arrangements shown in FIGS. 10 through 14, may be adopted instead. In FIG. 28, an output of a subtracter 46e, that is, an estimated disturbance $PF_{dis}$, is used as the judgement objective signal $V_x$. But, another signal may be used, as discussed in the second embodiment (see FIG. 27).

Figure 29:
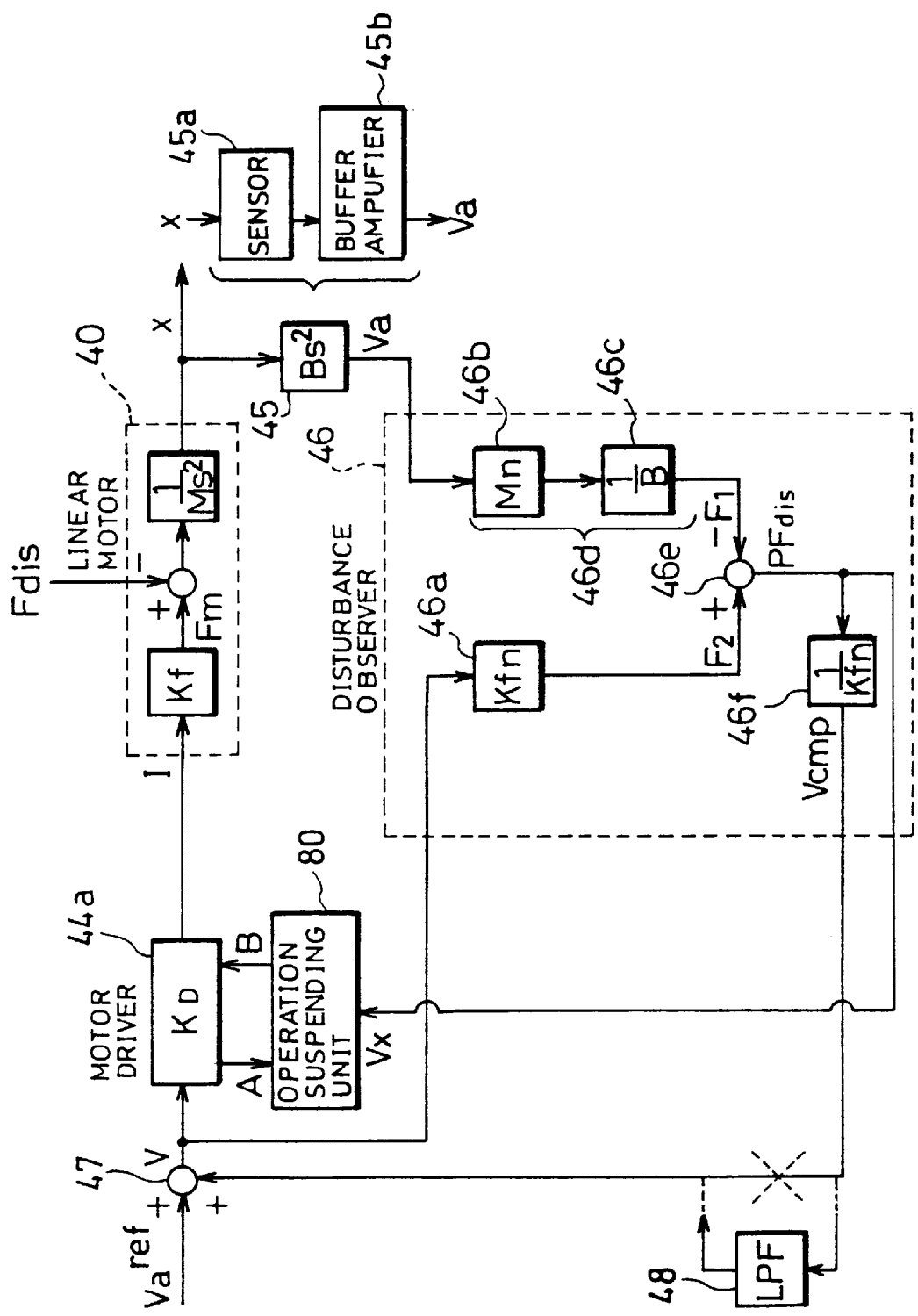
FIG. 29 is a block diagram illustrating another example of the motor control device, in accordance with the third embodiment of the present invention.
Figure 30:
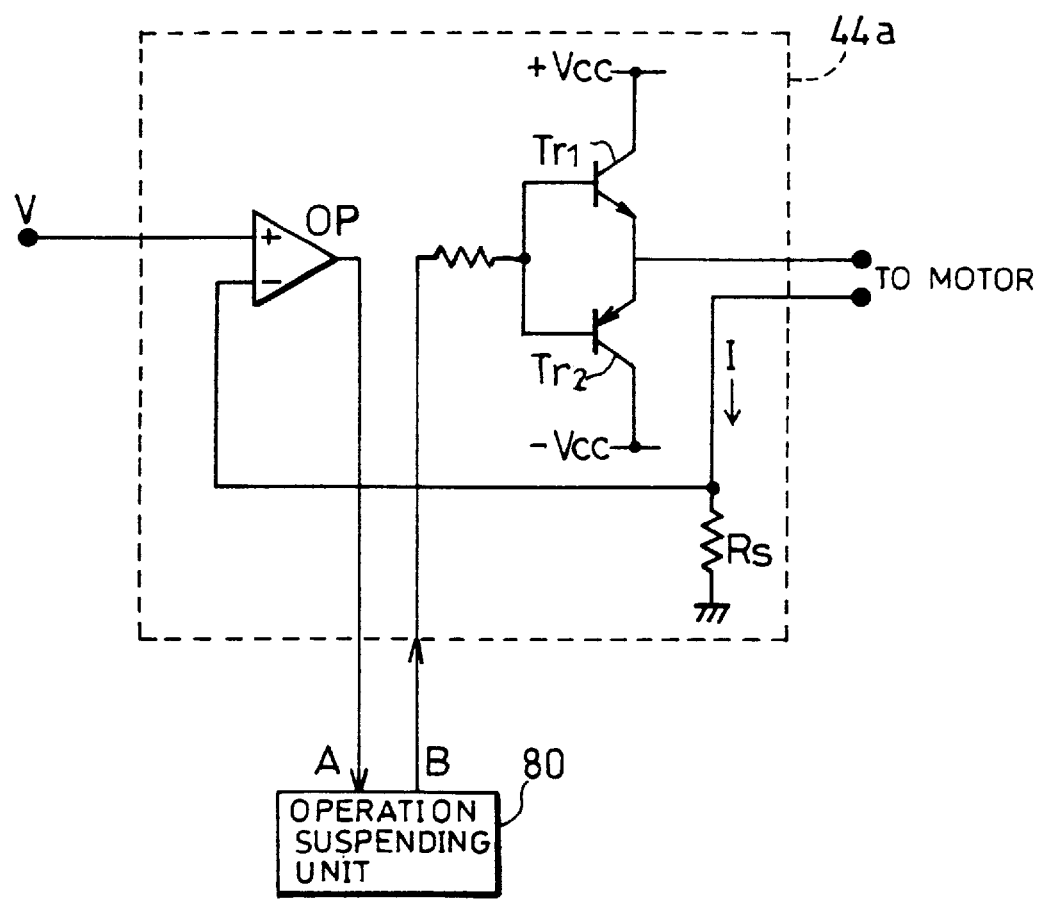
FIG. 30 is a view illustrating the correlation between the driver and the operation suspending unit in the motor control device shown in FIG. 29.

FIG. 29 is a block diagram illustrating another motor control device for use in an information recording and reproducing apparatus, which controls the operation suspending unit 80 to virtually suspend the operation for driving the motor. The motor control device shown in FIG. 29 has a motor driver 44a which has a circuit arrangement shown in FIG. 30, instead of the motor driver 44 shown in FIG. 28. The motor driver 44a is control by a switch 80d in the operation suspending unit 80 so that the connection or signal transfer between an OP amplifier OP and output transistors $Tr_1$ and $Tr_2$ is controlled. Unless it is required to distinguish the motor drivers 44 and 44a, they are both referred to as motor driver 44.

In the motor control device of the third embodiment, arranged as shown in FIG. 28 or as shown in FIG. 29, not the operation of the disturbance observer 46 but the operation of the motor driver 44 for driving a linear motor 40 is virtually suspended, when the judgement objective signal $V_x$ exceeds a predetermined level.

According to the arrangement of the second embodiment, while the operation of the disturbance observer 46 is suspended when collisions, shocks, or the like is detected, driving lines of the linear motor 40 is in the operating state. Therefore, when $V_a^{ref}$ is supplied from outside somehow, the linear motor 40 is driven up in response to the $V_a^{ref}$, thereby causing greater collisions. However, with the arrangement of the third embodiment, the operation of the linear motor 40 itself is virtually suspended, thereby never causing such a problem. Thus, more preferable control of the linear motor 40 is ensured.

[Fourth Embodiment]

The following description will discuss the fourth embodiment of the present invention.

Figure 31:
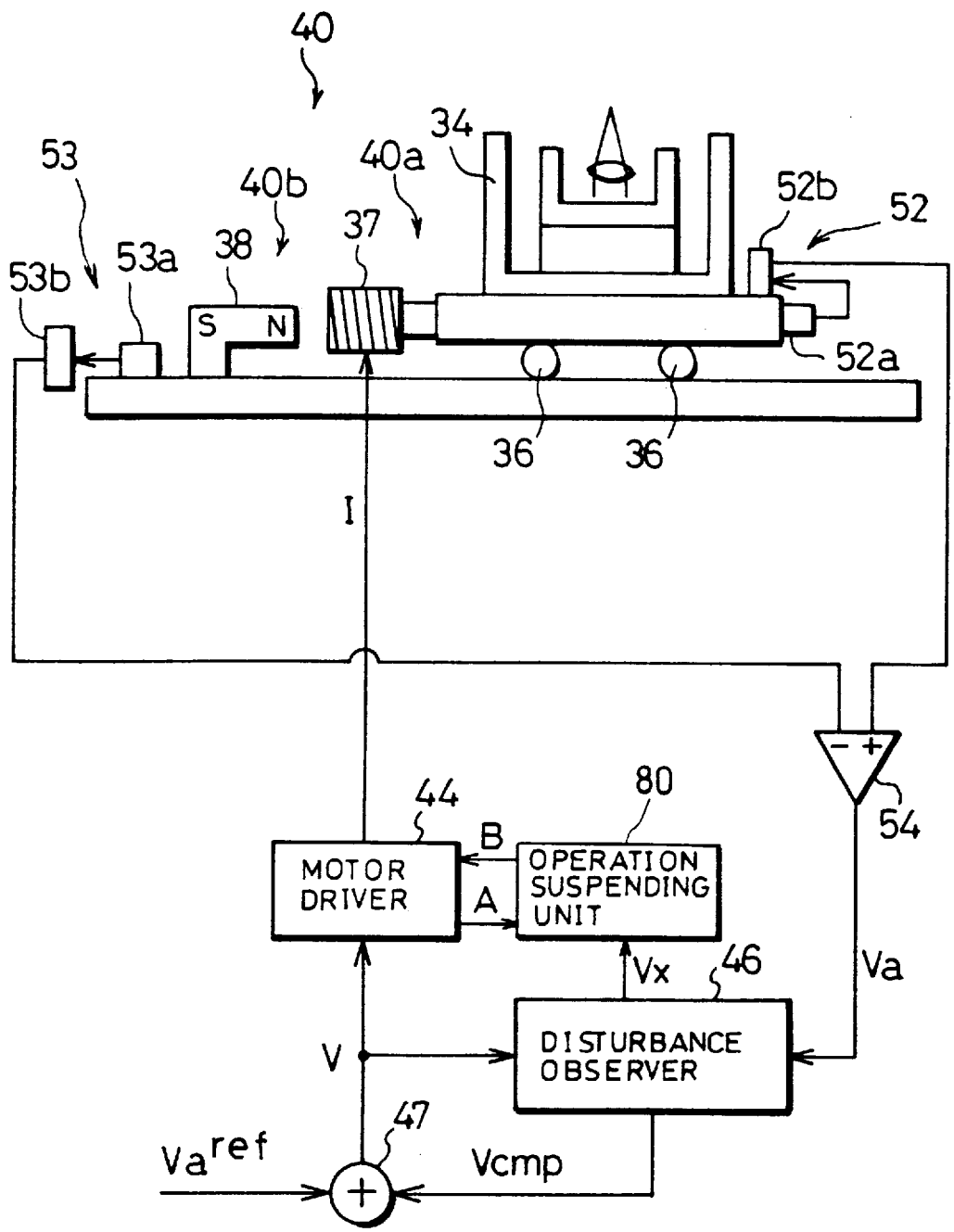
FIG. 31 is a block diagram illustrating an example arrangement of a motor control device, in accordance with the fourth embodiment of the present invention.

FIG. 31 illustrates an arrangement of a motor control device in accordance with the fourth embodiment of the present invention. Like the second and the third embodiments, a disturbance observer is adopted in the fourth embodiment so as to control a linear motor in an optical disk apparatus. According to the arrangement, acceleration sensors 52a and 53a are provided in a movable section 40a of a linear motor 40 which is an objective of control, and on a chassis 32 on which a stationary section 40b of the linear motor 40 is provided, respectively. Outputs of the acceleration sensor 52a and 53a are buffered by buffer amplifiers 52b and 53b, respectively. The buffered outputs are sent to a subtracter 54, which obtains a difference between them. The difference is sent to the disturbance observer 46 as an acceleration signal $V_a$. An operation suspending unit 80, having the same configuration as shown in FIG. 9 of the third embodiment, controls a motor driver 44 using the acceleration signal $V_a$ as a judgement objective signal $V_x$, thereby suspending the driving of the linear motor 40 when necessary. Note that the acceleration sensors 52a and 53a are arranged so as to have polarities such that: when accelerations in the same direction are given to the movable section 40a of the linear motor 40, and to the chassis 32 where the stationary section 40b of the linear motor 40 is provided, respectively, the outputs of the buffer amplifiers 52b and 53b cancel each other by means of the subtracter 54.

Incidentally, an apparatus employing a motor of various kinds is often required to conduct not absolute but relative control of the motor, that is, control of one part's relative motion to another part.

For example, as to a usual optical disk apparatus, an optical disk is rotated by a spindle motor provided on a chassis. Tracks, on and from which a recording and reproducing operation is carried out, shift relatively to the chassis as the optical disk rotates. On the other hand, the servo control system is expected to have an optical pickup to follow a specific track on the optical disk. Therefore, taking the arrangement shown in FIG. 31 as an example, the servo control system is required to move an optical pickup 34 provided in the movable section 40a of the linear motor 40, relatively to the chassis 32 (the stationary section 40b).

According to the arrangement of the fourth embodiment, a difference between the accelerations of the movable section 40a and the stationary section 40b of the linear motor 40 is detected. Accordingly, even when the stationary section 40b is reacted by the motion of the movable section 40a to a non-negligible extent, a relative acceleration of the movable section 40a to the stationary section 40b, which contains the acceleration due to the reaction, can be detected, thereby ensuring control of relative motions.

When great shocks are applied to the movable section 40a of the linear motor 40 due to collisions or the like, such a relative acceleration reflects it. Therefore, the operation suspending unit 80 controls the motor driver 44 so as to suspend the driving of the linear motor 40. Thus, as is the case of the third embodiment, it is preventible that the linear motor 40 and the optical pickup 34 moved by the linear motor 40 are damaged.

Figure 32:
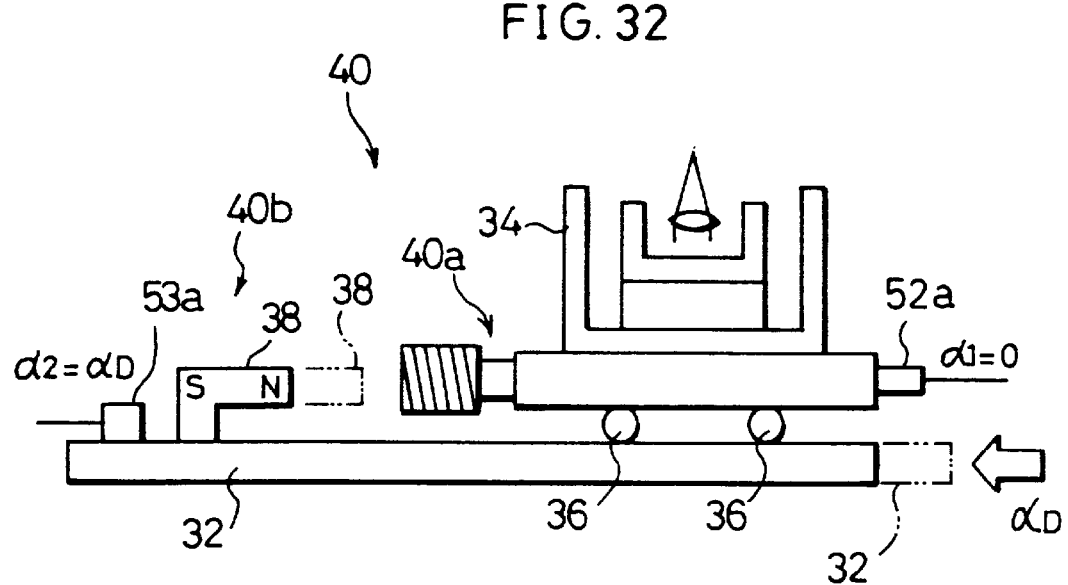
FIG. 32 is a view explaining a motion of the motor control device reacting to vibrations or shocks.

When vibrations or shocks due to an acceleration $\alpha_D$ is given from outside, it is possible that the movable section 40a has an acceleration $\alpha_1=0$ while the stationary section 40b has an acceleration $\alpha_2=\alpha_D$ when bearings 36 of the linear motor 40 slip very well (see FIG. 32). Therefore, as is the case of the arrangement of the third embodiment wherein only the movable section 40a is provided with the acceleration sensor unit 45, the disturbance observer 46 cannot restrain the vibrations or the shocks since the acceleration sensor unit 45 detects an acceleration of 0. In contrast, with the arrangement of the fourth embodiment wherein the acceleration sensor units 52 and 53 are provided in the movable section 40a and the stationary section 40b, respectively, it is possible to detect a relative acceleration ($\alpha_1-\alpha_2=-\alpha_D$). In response to such a motion independent from the reference drive signal $V_a^{ref}$ sent from outside, the disturbance observer 46 drives the movable section 40a so that the relative acceleration becomes 0, thereby restraining the affection of such vibrations and shocks.

Here, even though the acceleration applied to the movable section 40a is small, the relative acceleration is great when the acceleration of the optical disk apparatus, that is, the acceleration of the stationary section 40b, is great. Therefore, the operation suspending unit 80 is caused to act on it. As a result, irrelevant to whether or not the movable section 40a provided with the optical pickup 34 is affected by any shock or the like, the control of or the operation by the linear motor 40 is suspended. As described in the third embodiment, since the operation suspending unit 80 operates when a disturbance exceeding the maximum thrust or acceleration the motor can output or cause, it would be impossible to oppose the disturbance of vibrations, shocks, or the like even if the control operation were not suspended. Therefore, the suspension of the control causes no problem.

Note that it is possible to employ the same configurations as shown in FIGS. 21 through 24 as the first acceleration sensor unit 52 (composed of the acceleration sensor 52a and the buffer amplifier 52b) and the second acceleration sensor unit 53 (composed of the acceleration sensor 53a and the buffer amplifier 53b). It is also possible to use any of arrangements shown in FIGS. 10 through 14 as the operation suspending unit 80.

Figure 33:
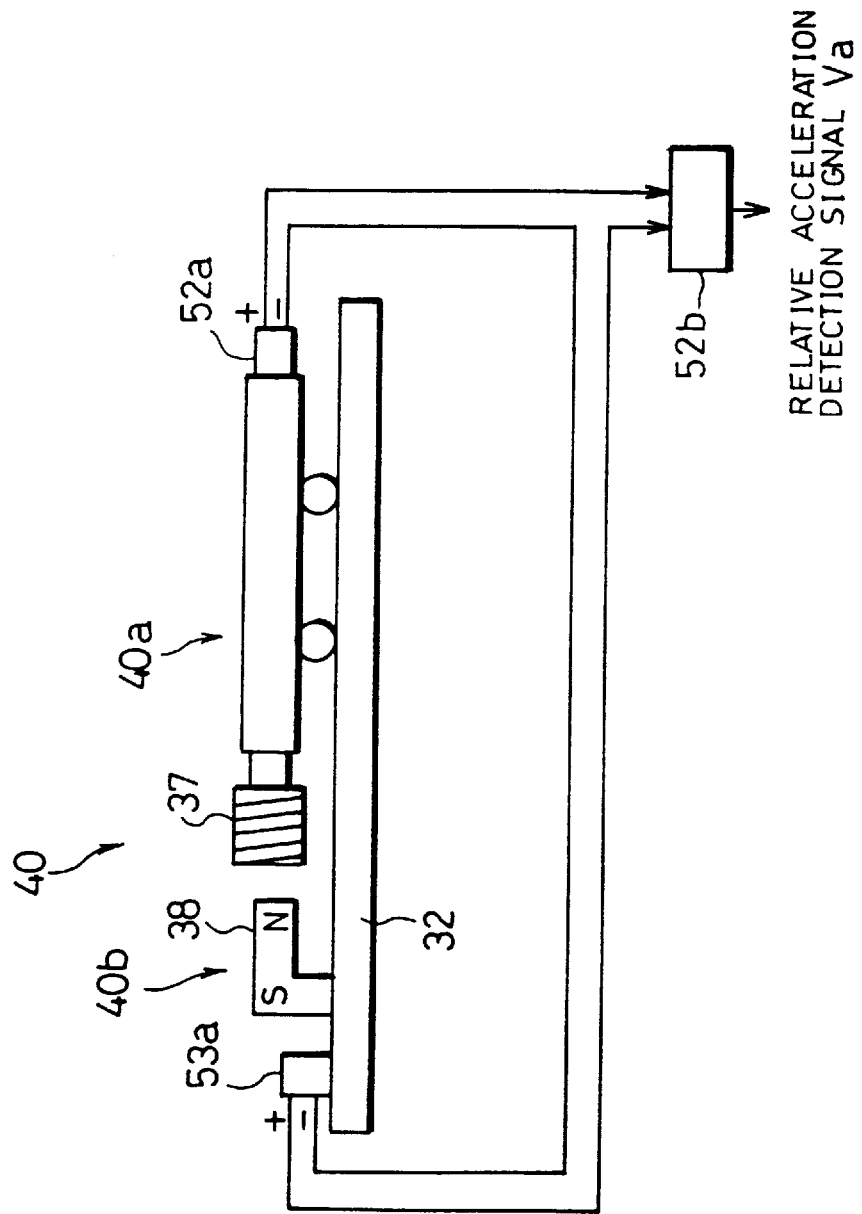
FIG. 33 is a view illustrating another manner of connection of the acceleration sensors in the motor control device.
Figure 34:
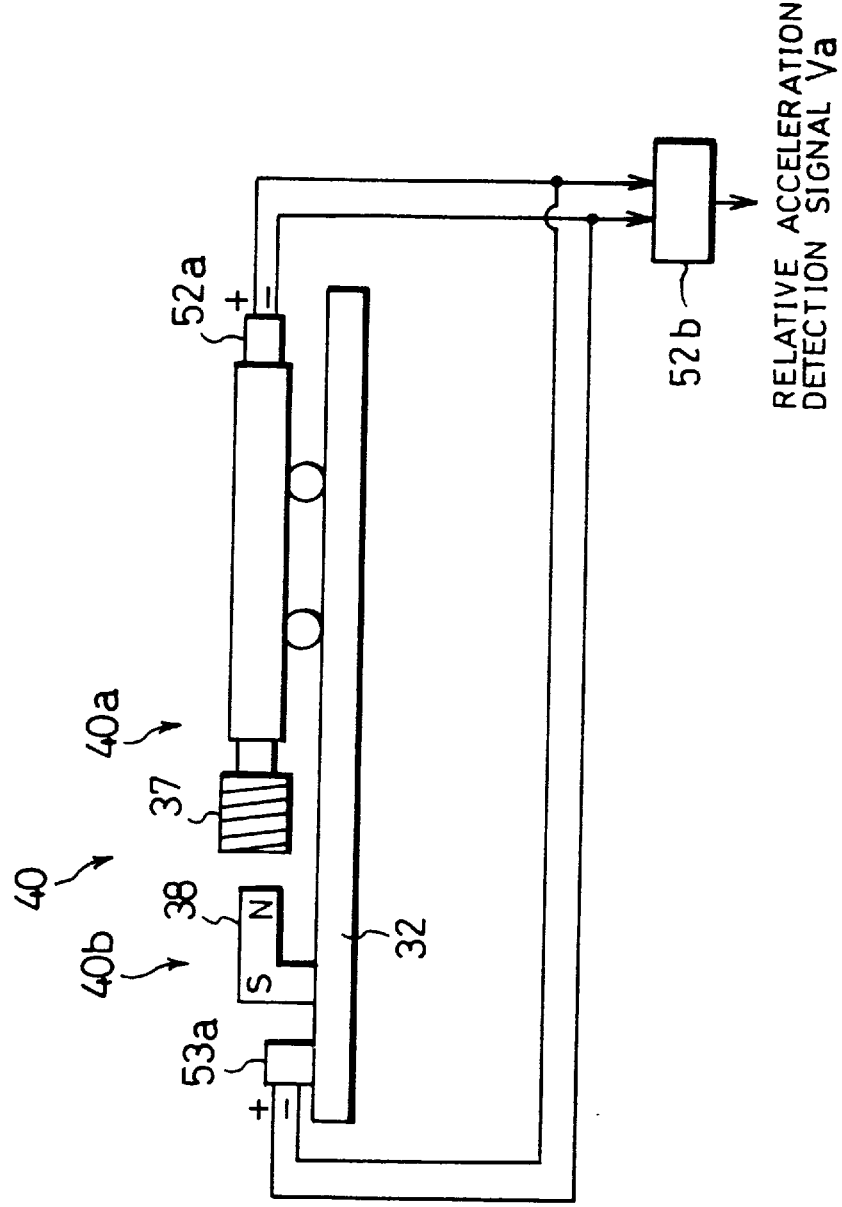
FIG. 34 is a view illustrating still another manner of connection of the acceleration sensors the motor control device.

As shown in FIG. 31, the difference between the outputs of the buffer amplifiers 52b and 53b of the respective acceleration sensors 52a and 53a is obtained so as to detect the relative acceleration of the movable section 40a to the stationary section 40b. However, the described arrangement may be varied in many ways. For example, as shown in FIG. 33, without the subtracter 54, the acceleration sensors 52a and 53a may be connected in reverse series so as to subtract the output of the acceleration sensor 53a from the output of the acceleration sensor 52a and the subtracted result may be buffered by the buffer amplifier 52b. Alternatively, as shown in FIG. 34, the acceleration sensors 52a and 53a may be connected in reverse parallel so as to add the output of the acceleration sensor 52a and the output of the acceleration sensor 53a and the added result may be buffered by the buffer amplifier 52b. The same effect as that of the present embodiment can be achieved provided that the relative acceleration of the movable section 40a to the stationary section 40b can be detected. Note that the signs + and − attached to the acceleration sensors 52a and 53a indicate the polarities of voltages or currents which are generated when both the sensors detect the accelerations in the same direction.

[Fifth Embodiment]

The following description will discuss the fifth embodiment of the present invention. A motor control device of the fifth embodiment has a configuration which is substantially same as that of the fourth embodiment except the connection between the operation suspending unit and the acceleration detecting sensor (the acceleration sensors and the buffer amplifiers).

Figure 35:
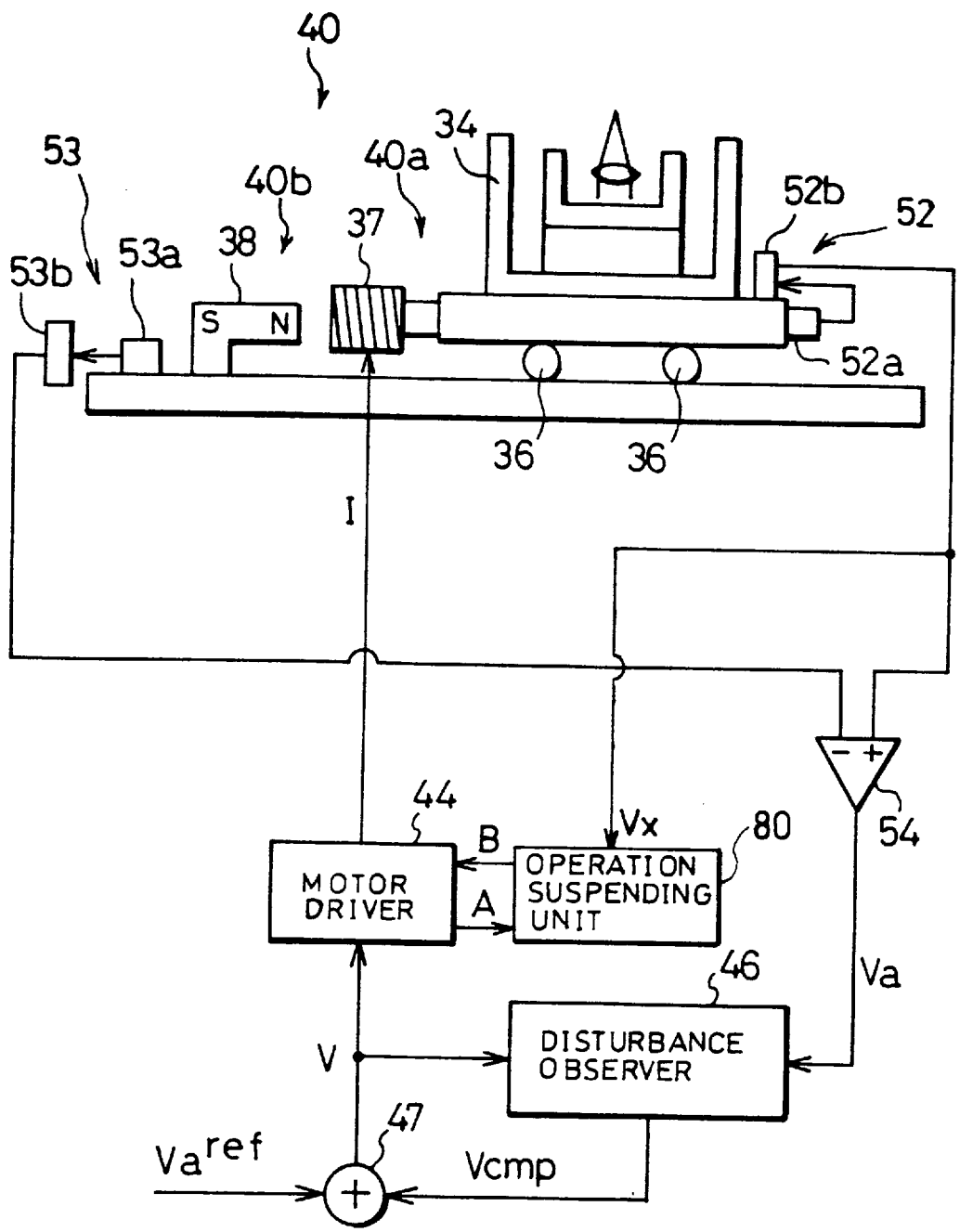
FIG. 35 is a block diagram illustrating an example arrangement of a motor control device, in accordance with the fifth embodiment of the present invention.
Figure 36:
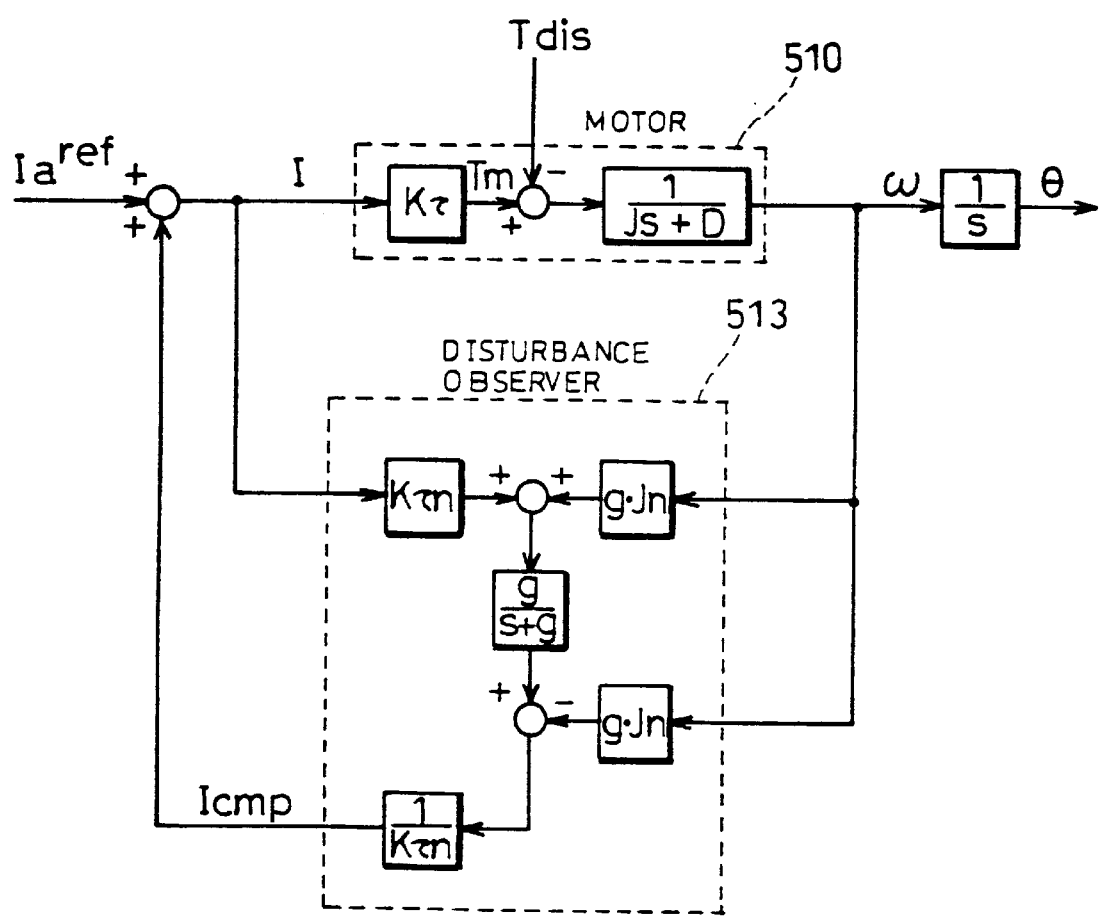
FIG. 36 is a block diagram of a conventional motor control device utilizing a disturbance observer.
Figure 37:
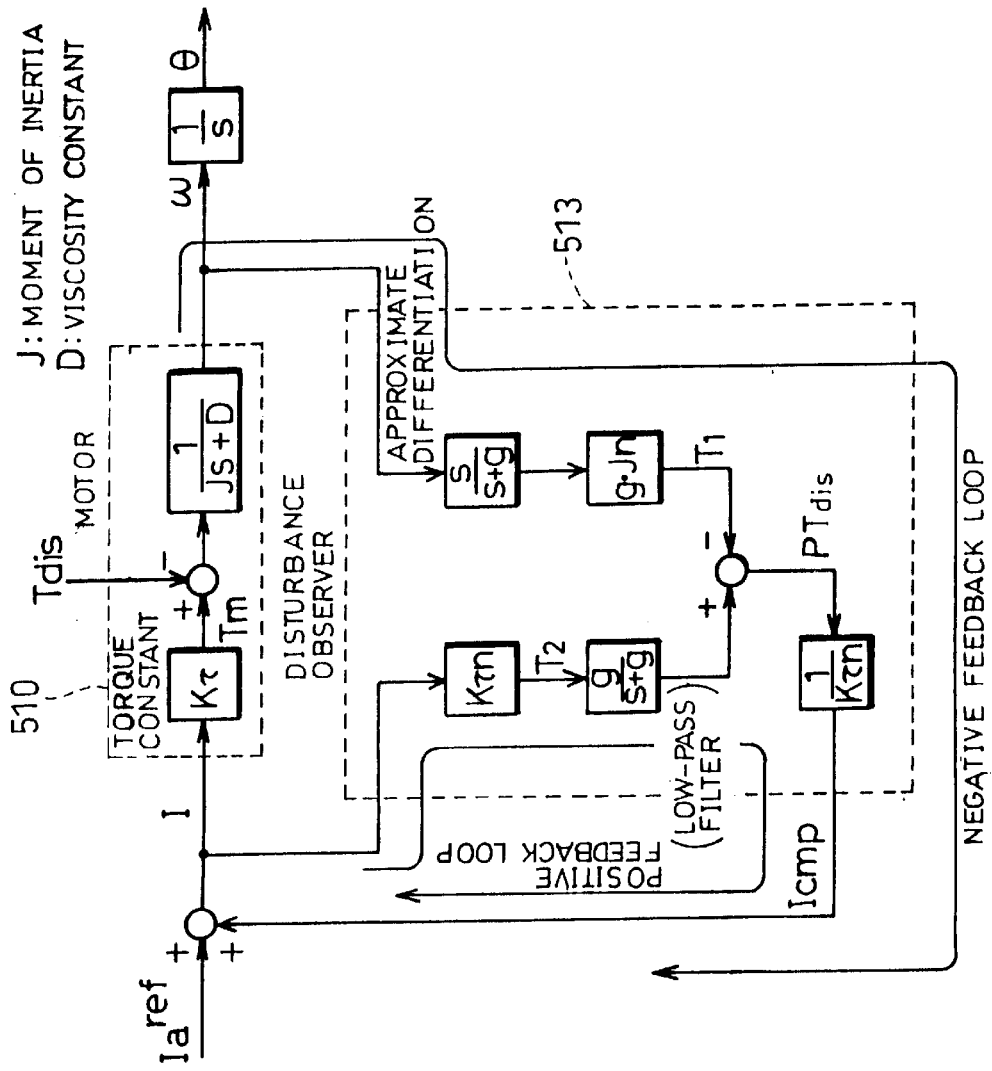
FIG. 37 is a block diagram of the conventional motor control device, with the disturbance observer re-drawn by an equivalent conversion.

FIG. 35 illustrates an arrangement of a motor control device in accordance with the fifth embodiment of the present invention. Acceleration sensors 52a and 53a are provided in a movable section 40a of a linear motor 40 which is an objective of the control, and a chassis 32 on which a stationary section 40b of the linear motor 40 is provided, respectively. Accelerations detected by the acceleration sensors 52a and 53a are buffered by buffer amplifiers 52b and 53b, and a difference between them is obtained by a subtracter 54. The difference is sent to the disturbance observer 46 as an acceleration signal $V_a$ indicating a relative acceleration of the movable section 40a to the stationary section 40b. The acceleration sensor 52a and 53a are arranged so as to have polarities such that: when accelerations in the same direction are given to the movable section 40a of the linear motor 40, and to the chassis 32 where the stationary section 40b of the linear motor 40 is provided, respectively, the outputs of the buffer amplifiers 52b and 53b cancel each other by means of the subtracter 54.

An operation suspending unit 80 of the present embodiment, having the same configuration as that of the fourth embodiment shown in FIG. 9, controls a motor driver 44 so as to suspend the driving of the linear motor 40. However, the present unit 80 is different from that of the fourth embodiment in that used as a judgement objective signal $V_x$ is, not the acceleration signal $V_a$ indicating a relative acceleration of the movable section 40a to the stationary section 40b, but an output of the acceleration sensor 52a provided in the movable section 40a of the linear motor 40 (more exactly, an output of the buffer amplifier 52b).

The motor control device in accordance with the fourth embodiment has an advantage that accurate control of the linear motor 40 can be carried out since the acceleration signal $V_a$ indicating a relative acceleration of the movable section 40a to the stationary section 40b is sent to the disturbance observer 46. On the other hand, the acceleration signal $V_a$, indicating a relative acceleration, is also used as the judgement objective signal $V_x$ for the operation suspending unit 80. Accordingly, the operation suspending unit 80 operates, when a disturbance acceleration given to the optical disk apparatus as a whole (that is, a disturbance acceleration given to the stationary section 40b of the linear motor 40) is great even though an acceleration given to the movable section 40a due to a disturbance such as shocks is small, thereby suspending the control or driving of the linear motor 40. As mentioned before, the operation suspending unit 80 operates only when receiving a disturbance exceeding the maximum thrust or acceleration of the motor. Even if the control were not suspended, it would be impossible to oppose a disturbance such as vibrations or shocks. Therefore, in such a case, the suspension of the control does not cause any problem.

However, when a disturbance acceleration applied to the optical disk apparatus as a whole, i.e., a disturbance acceleration applied to the stationary section 40b, has been great for a short period of time, displacement of the movable section 40a caused by such a disturbance is small, thereby affecting little the two-stage tracking servo operation (see the second embodiment) conducted by the linear motor 40 and the lens actuator system 34b. In such a case, even though a relative acceleration of the movable section 40a to the stationary section 40*b* is great, it is preferable not to suspend the control or driving of the linear motor 40, because of the following advantages: (1) it is avoidable not to suspend the tracking servo control, that is, the operation of the optical disk apparatus; (2) a tracking servo control error is quickly converged after the disturbance stops; and (3) even when the tracking servo control is suspended, it does not have to be resumed from the operation of the disturbance observer or the driver, thereby ensuring quick restoration and resumption of the operation.

On the other hand, when a great disturbance acceleration has been actually given to the movable section 40*a* of the linear motor 40 for a short time, it is preferable to immediately suspend the control or driving of the linear motor 40, so as to prevent the linear motor 40 and the optical pickup 34 from being damaged.

The motor control device in accordance with the fifth embodiment has the same advantages of the motor control device in accordance with the fourth embodiment, which are as follows: (1) it is avoidable that the linear motor 40 and the optical pickup 34 are damaged; and (2) the linear motor 40 is precisely controlled by supplying the disturbance observer 46 with the acceleration signal $V_X$ indicating a relative acceleration of the movable section 40*a* to the stationary section 40*b*.

According to the arrangement of the motor control device in accordance with the fifth embodiment, a signal outputted by the acceleration sensor 52*a* provided in the movable section 40*a* (precisely, a signal obtained by the buffer amplifier 52*b*'s buffering the signal sent from the acceleration sensor 52*a*) is sent to the operation suspending unit 80 as a judgement objective signal $V_x$. As a result, the control operation of the linear motor 40 is suspended only when a great acceleration is given to the movable section 40*a* due to collisions or the like. Therefore, in addition to the advantages described above, the motor control device of the fifth embodiment has further advantages as follows: (1) suspending the tracking servo control is avoidable; (2) a tracking servo control error is quickly converged; (3) the tracking servo control operation is quickly restored and resumed.

A first acceleration sensor unit 52 and a second acceleration sensor unit 53 in the present embodiment may have the same configuration as any of those shown in FIGS. 21 through 24. The operation suspending unit 80 may have the same configuration as any of those shown in FIGS. 10 through 14. Furthermore, a signal obtained by properly amplifying the signal outputted by the acceleration sensor 52*a* provided in the movable section 40*a* may be used as the judgement objective signal $V_x$.

As has been described, each motor control device in accordance with the first through fifth embodiments of the present invention, is composed of (1) a driving circuit (the driver 12, or the motor driver 44) for generating a driving signal for driving the motor in response to an inputted signal, (2) a detecting circuit for detecting a condition of the motor, (3) a disturbance observer (disturbance observer 13, or 46) for outputting a signal for compensating a disturbance which shows a change in the condition of the motor, based on the condition of the motor detected by the detecting circuit and the driving signal for driving the motor, (4) a compensating circuit (the adder 11, or 47) for compensating the driving signal for driving the motor based on the output of the disturbance observer, (5) a judging unit (the comparators 80*a* and 80*b*) for judging whether or not the disturbance applied to the motor has an abnormal magnitude, and (6) an abnormal disturbance counteracting unit (the operation suspending unit 80) for restricting the driving of the motor based on the output of the judging unit when the disturbance has an abnormal magnitude.

According to the above arrangement, the detecting circuit, such as a velocity sensor or an acceleration sensor, usually detects velocity or acceleration of the motor. The disturbance observer computes a disturbance which includes parameter variations, vibrations, and forces applied from outside, based on the output of the detecting circuit and the driving signal for driving the motor, so as to output the signal for compensating the disturbance. The compensating circuit compensates the driving signal for driving the motor, based on the output of the disturbance observer. This enables the motor to suppress the affection of the disturbance such as parameter variations and vibrations, thereby causing the member driven by the motor to follow a target (for example, a track on an optical disk). On the other hand, when a disturbance with an abnormal magnitude is applied to the motor, for example, when the motor or the movable section of the motor is driven beyond the motion space and comes into collisions with a stopper, or when great shocks are given, the judging unit detects such abnormality based on, for example, the output of the detecting circuit or the output of the disturbance observer. In accordance with the output of the judging unit, the abnormal disturbance counteracting unit restricts the driving of the motor. This results in solving such a problem as the disturbance observer excessively drives the motor, for example, the disturbance observer further drives the motor so as to cause the collisions to have a greater magnitude. Therefore, it is preventible that the motor, the mechanism or the section driven by the motor is damaged.

An arrangement which ensures that the abnormal disturbance counteracting unit restricts the driving of the motor can be varied in many ways. A first motor control device of the present invention is, as shown in the first and second embodiments, arranged so that an operation suspending unit (80) for suspending the operation of the disturbance observer when abnormality occurs is provided in the abnormal disturbance counteracting unit. The operation suspending unit (80) is realized by, for example, a cutoff circuit for cutting off the transmission of the driving signal, provided between the driving circuit and the compensating circuit through the disturbance observer. The cutoff circuit virtually suspends the operation of the disturbance observer, resulting in that the above-mentioned effect can be achieved. Especially when the cutting off of the signal transfer is carried out by the cutoff circuit (the switch 80*d*) between the driving circuit and the comparing circuit (the subtracter 13*g*, or 46*e*) which computes a disturbance by comparing an actual value and an estimated value of the condition of the motor (see FIG. 15, or 26), the disturbance observer's operation of opposing or overcoming the disturbance is prevented, while only a negative feedback loop for feeding back the disturbance to the motor operates. As a result, the shocks are eased, therefore, this is more preferable.

According to the first arrangement, when the disturbance has an abnormal magnitude, the driving circuit drives the motor in accordance with an input from outside whereas the operation of the disturbance observer is suspended. This may cause the motor to be driven in a direction such that the collisions have a greater magnitude, thereby causing the motor and other parts to be damaged. In contrast, as is clear from the third embodiment, a second motor control device is arranged so that an operation suspending unit (80) for suspending the driving of the motor when abnormality occurs is provided in an abnormal disturbance counteracting unit. Note that the operation suspending unit is realized by a cutoff circuit (80d) for cutting off, for example, an input to or an output from the driving circuit. As a result, when a disturbance with an abnormal magnitude is applied, the motor can be suspended irrelevant to the input supplied to the driving circuit from outside. Thus, this arrangement more surely prevents damage on the motor and other parts, therefore it is more preferable.

The timing when the abnormal disturbance counteracting unit operates can be varied as well. It is preferable that the abnormal disturbance counteracting unit restricts the driving of the motor for a period of time while a disturbance with an abnormal magnitude is applied (see FIG. 9, or 10). In this case, the foregoing effect can be achieved with a simple arrangement.

It is also preferable that, as shown in FIG. 11 or 12, the abnormal disturbance counteracting unit is provided with a timing control circuit (the monostable multivibrator 80h, or 80i) for getting the abnormal disturbance counteracting unit to restrict the driving of the motor in accordance with an output of the judging unit for a predetermined period of time since the disturbance with an abnormal magnitude starts. With this arrangement, when it is possible that disturbances such as collisions and great shocks sequentially occur, an excessive driving of the motor is prevented until the disturbances such as collisions and shocks are converged within an enough small range. Therefore, it is avoidable that the motor is excessively driven immediately after the disturbance is settled down, thereby ensuring that damaging parts such as the motor is prevented.

It is more preferable that, as shown in FIG. 13, or 14, the abnormal disturbance counteracting unit is provided with a timing control circuit (the monostable vibrator 80k and the AND gate 80j, or the monostable vibrator 80r and the second OR gate 80g) for controlling the abnormal disturbance counteracting unit to restrict the driving of the motor in accordance with an output of the judging unit, for a period of time while the disturbance with an abnormal magnitude is applied and for a predetermined period of time since the disturbance becomes within a predetermined range. With this arrangement, even though the shocks have been given for a long period of time, the excessive driving of the motor is prevented during a period of time while the abnormal disturbance is applied and while the abnormal disturbance is converged within an enough small range. Therefore, the damaging of parts can be more effectually prevented.

There are several ways how the judging unit judges whether or not abnormality occurs. It is preferable that the judging unit judges, in accordance with an output of the detecting circuit, whether a disturbance applied to the motor has an abnormal magnitude or not (see FIG. 27). In this case, since the judgement can be made based on an acceleration caused by the disturbance such as collisions, it is easy to judge whether or not the disturbance has an abnormal magnitude. According to another preferable arrangement (see FIG. 1), the judging unit judges, in accordance with an output of the disturbance observer, whether a disturbance applied to the motor has an abnormal magnitude or not. In this case, abnormality is detected, not only when it is caused by collisions, but also when an excessive input for driving the motor is supplied from outside.

In addition, as is clear from the second through fifth embodiments, the detecting circuit is preferably an acceleration detecting circuit (the acceleration sensor unit 45, 52, or 53). With such an arrangement, the disturbance observer is not required to carry out differential operation inside. Therefore, an amplifier with a high gain proportional to a bandwidth for the differential operation is unnecessary in the configuration of the disturbance observer. This results in simplification of the circuit arrangement and reduction of affections of noises due to sensors and circuits. Furthermore, more flexibility is allowed in selecting a signal as a reference which the judging unit uses in judging whether abnormality occurs.

As to the arrangement of the acceleration detecting circuit, it is preferable that, as shown in FIGS. 19 through 22, or FIGS. 23(a) through 23(c), the acceleration detecting circuit includes an element for transducing quantity of mechanical distortion caused by an acceleration into an electric signal. Such an arrangement can be realized by using a piezoelectric element, therefore can be miniaturized. As a result, there are a fewer requisites to satisfy in setting such an acceleration detecting circuit. In addition, the space around the motor, where the acceleration detecting circuit is provided, can be reduced. According to another preferable arrangement (see FIG. 24), the acceleration detecting circuit includes an element (the acceleration sensor unit 24) for transducing quantity of mechanical distortion caused by an acceleration into an electric signal for cancelling the mechanical distortion. Such an arrangement can be achieved, for example, as an integrated circuit incorporating peripheral circuits, using the micromachining technology. Therefore, the acceleration detecting circuit which is thus miniaturized, allows flexibility in its setting, and is less affected by noises, can be obtained.

As clear from the fourth and fifth embodiments, it is more preferable that the acceleration detecting circuit detects a relative acceleration of the movable section of the motor to the stationary section of the motor. With such an arrangement, the acceleration detecting circuit accurately detects an acceleration of the movable section relative to the stationary section which is obtained when a reaction of the stationary section to the movable section during driving of the motor, vibrations, shocks, or the like is given. Therefore, the motor control device can more accurately control the motor.

As clear from the fifth embodiment, it is still more preferable that the disturbance observer outputs a signal for compensating a change in the condition of the motor, based on the driving signal for driving the motor and an output of a relative acceleration computing circuit (the subtracter 54 and the buffer amplifier 52b) which computes a relative acceleration of the movable section to the stationary section of the motor, while the judging unit judges whether or not abnormality exists based on an output of the first acceleration detecting circuit (the first acceleration sensor unit 52) for detecting an acceleration of the movable section of the motor. With such an arrangement, more appropriate control of the motor can be achieved, as is with the foregoing arrangement. In addition, since the judging unit judges whether or not abnormality occurs based on the acceleration applied to the movable section, the abnormality counteracting control unit operates only when the shocks or the like are actually given to the movable section. Therefore, when the disturbance such as vibrations and shocks is given to the whole device, the motor control device as a whole, including the disturbance observer, remains in the operating state. Consequently, the motor control device ensures that the motor control continues and that control errors are more quickly converged. In addition, after the disturbance is converged, the control is resumed immediately.

In the first through fifth embodiments, the motor control device controls the motor which moves an information recording/reproducing unit (head 3, optical pickup 34) of an information recording and reproducing apparatus, but it is also employed for controlling motors for other uses. Note that the motor control device is effectual when it controls a motor which is required to withstand shocks on the motor or parts driven by the motor and which requires high accuracy in the control. Therefore, the motor control device of the present invention is suitable particularly for controlling the motor moving an information recording and reproducing unit along a surface of a disk-type recording medium, the information recording and reproducing unit carrying out at least one of recording and reproducing of information with respect to the disk-type recording medium.

In the first through fifth embodiments, the swing motor 10 which is a rotary-type driving device rotating in both the directions and the linear motor 40 which is a reciprocal-type driving device are employed as examples of the objective of control, but others are also applicable. For example, driving device in other arrangements, such as a rotary-type device rotating in one direction, may be adopted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor control device for controlling a motor, comprising:

driving means for generating a driving signal for driving said motor in response to an inputted signal;

detecting means for detecting a condition of said motor;

a disturbance observer for outputting a signal for compensating a disturbance indicative of a change in the condition of said motor, based on the condition of said motor detected by said detecting means and the driving signal;

compensating means for compensating the driving signal based on the output of said disturbance observer;

judging means for judging whether or not the disturbance applied to said motor has an abnormal magnitude; and abnormal disturbance counteracting means for restricting the driving of said motor based on the output of said judging means when the disturbance has the abnormal magnitude.

2. The motor control device as set forth in claim 1, wherein said abnormal disturbance counteracting means includes operation suspending means for suspending an operation of said disturbance observer so as to restrict the driving of said motor when the disturbance has the abnormal magnitude.

3. The motor control device as set forth in claim 2, wherein said operation suspending means includes cutoff means, provided between said driving means and said compensating means through said disturbance observer, for cutting off a transfer of the driving signal when the disturbance has the abnormal magnitude.

4. The motor control device as set forth in claim 3, wherein:

said disturbance observer includes comparing means for comparing an actual value on a condition of said motor which is obtained based on an output of said detecting means, and an estimated value on a condition of said motor which is computed based on the driving signal, and for computing the disturbance in accordance with the comparison; and said cutoff means cuts off the signal transfer between the driving means and said comparing means, when the disturbance has the abnormal magnitude.

5. The motor control device as set forth in claim 1, wherein said abnormal disturbance counteracting means includes operation suspending means for suspending a motion of said motor when the disturbance has the abnormal magnitude.

6. The motor control device as set forth in claim 5, wherein said operation suspending means includes cutoff means for cutting off an input to said driving means when the disturbance has the abnormal magnitude.

7. The motor control device as set forth in claim 5, wherein said abnormal disturbance counteracting means includes cutoff means for suspending an outputting of said driving means when the disturbance has the abnormal magnitude.

8. The motor control device as set forth in claim 1, wherein said abnormal disturbance counteracting means restricts a driving of said motor in accordance with an output of said judging means during a period of time while the disturbance with an abnormal magnitude is applied.

9. The motor control device as set forth in claim 1, wherein said abnormal disturbance counteracting means includes timing control means for controlling said abnormal disturbance counteracting means to restrict a driving of said motor in accordance with an output of said judging means for a predetermined period of time since the disturbance with an abnormal magnitude occurs.

10. The motor control device as set forth in claim 9, wherein said timing control means includes a monostable multivibrator for outputting a signal with a level indicating abnormality for a predetermined period of time since said judging means detects the abnormality.

11. The motor control device as set forth in claim 1, wherein said abnormal disturbance counteracting means includes timing control means for controlling said abnormal disturbance counteracting means to restrict a driving of said motor in accordance with an output of said judging means for a period of time while the disturbance with an abnormal magnitude is applied and for a predetermined period of time since the disturbance becomes within a predetermined range.

12. The motor control device as set forth in claim 11, wherein said timing control means includes a monostable multivibrator and a logical circuit, the monostable multivibrator outputting a signal with a level indicating abnormality for a predetermined period of time since said judging means detects the convergence of abnormality, and the logical circuit outputting a signal with a level indicating abnormality while at least one of said judging means and said monostable multivibrator remains detecting the abnormality.

13. The motor control device as set forth in claim 1, wherein said judging means judges, in accordance with an output of said detecting means, whether the disturbance applied to said motor has an abnormal magnitude or not.

14. The motor control device as set forth in claim 1, wherein said judging means judges, in accordance with an output of said disturbance observer, whether the disturbance applied to said motor has an abnormal magnitude or not.

15. The motor control device as set forth in claim 1, wherein said detecting means is acceleration detector.

16. The motor control device as set forth in claim 15, wherein said acceleration detector includes an element for transducing quantity of distortion caused by an acceleration into an electric signal.

17. The motor control device as set forth in claim 15, wherein said acceleration detector includes an element for outputting quantity of electricity required for cancelling quantity of mechanical distortion caused by an acceleration.

18. The motor control device as set forth in claim 15, wherein said acceleration detector detects a relative acceleration of a movable section to a stationary section of said motor.

19. The motor control device as set forth in claim 18, wherein said acceleration detector includes:

first acceleration detecting means provided in the movable section;

second acceleration detecting means provided in the stationary section; and relative acceleration computing means for computing a relative acceleration of the movable section to the stationary section, based on outputs of said first and second acceleration detecting means.

20. The motor control device as set forth in claim 19, wherein:

said disturbance observer outputs a signal for compensating a change in the condition of said motor, based on the driving signal and an output of said relative acceleration computing means; and said judging means judges whether or not abnormality exists based on an output of said first acceleration detecting means.

21. The motor control device as set forth in claim 1, being used for controlling a motor moving an information recording/reproducing unit along a surface of a disk-type recording medium, the information recording/reproducing unit carrying out at least one of recording and reproducing of information with respect to the disk-type recording medium.

* * * * *